United States Patent
Brende et al.

(10) Patent No.: US 12,436,946 B2
(45) Date of Patent: Oct. 7, 2025

(54) SYSTEMS AND METHODS FOR FACILITATING DATABASE QUERIES

(71) Applicant: Querywise LLC, Austin, TX (US)

(72) Inventors: Hans Brende, Austin, TX (US); Joshua Mize, Austin, TX (US); Kevin Pauli, Austin, TX (US); Srivatsan Raman, Austin, TX (US); Vishnu Alavur Kannan, Austin, TX (US)

(73) Assignee: Querywise LLC, Austin, TX (US)

( * ) Notice: Subject to any disclaimer, the term of this patent is extended or adjusted under 35 U.S.C. 154(b) by 0 days.

(21) Appl. No.: 18/673,264

(22) Filed: May 23, 2024

(65) Prior Publication Data

US 2024/0394251 A1    Nov. 28, 2024

Related U.S. Application Data

(60) Provisional application No. 63/468,472, filed on May 23, 2023.

(51) Int. Cl.
| | |
|---|---|
| *G06F 17/00* | (2019.01) |
| *G06F 11/34* | (2006.01) |
| *G06F 16/2452* | (2019.01) |
| *G06F 16/2453* | (2019.01) |

(52) U.S. Cl.
CPC .... *G06F 16/24528* (2019.01); *G06F 11/3409* (2013.01); *G06F 16/24535* (2019.01)

(58) Field of Classification Search
CPC .......... G06F 16/24528; G06F 16/3409; G06F 16/24535; G06F 11/3409
See application file for complete search history.

(56) References Cited

U.S. PATENT DOCUMENTS

| | | | |
|---|---|---|---|
| 10,754,877 B2 * | 8/2020 | Kassko | G06F 16/2219 |
| 11,074,250 B2 * | 7/2021 | Flaks | G06F 16/367 |
| 11,681,732 B2 * | 6/2023 | Boxwell | G06F 16/9538 707/748 |
| 11,934,403 B2 * | 3/2024 | Rodriguez | G06N 20/00 |
| 12,067,366 B1 * | 8/2024 | Heller | G06F 40/35 |

\* cited by examiner

*Primary Examiner* — Greta L Robinson
(74) *Attorney, Agent, or Firm* — Outlier Patent Attorneys, PLLC

(57) ABSTRACT

Approaches are described for facilitating database queries. A data model associated with multiple data stores is received. A natural language question for a data set maintained across these data stores is obtained, where the data set is stored in a non-standardized format and not directly accessible by the querying device. An abstracted query representation is generated and translated into a standardized expression language based on the data model. Query processing approaches identify a predefined query pattern optimized for system performance metrics. An executable query is generated from the identified query pattern and provided to access the data stores. The query is executed to retrieve the data set, formatted as a structured view for unified access to dispersed data.

20 Claims, 13 Drawing Sheets

SYSTEMS AND METHODS FOR FACILITATING DATABASE QUERIES

CROSS-REFERENCE TO RELATED APPLICATIONS

This application claims priority to U.S. Provisional Application No. 63/468,472, entitled "SYSTEMS AND METHODS FOR FACILITATING DATABASE QUERIES," filed May 23, 2023, which is incorporated herein by reference for all purposes.

BACKGROUND

Field of the Art

The systems and methods disclosed herein are related generally to database queries and more specifically to facilitating database queries.

Discussion of the State of the Art

In our rapidly digitalizing world, the utilization of databases is a fundamental part of daily operations across various sectors, including business, healthcare, and education. Database structures, such as relational, NoSQL, or graph databases, each have unique schemas and indexing methods dictating how data is stored and retrieved. However, effective use of these databases presents significant challenges, particularly in accessing and querying data efficiently. Common querying languages like SQL for relational databases or Cypher for graph databases are required to extract data from these systems. There is often a significant gap between those who possess deep knowledge of these database structures and languages, and those who rely on the data to make strategic decisions or perform essential operations.

Traditional approaches have involved intermediary software tools or services that attempt to parse natural language inputs and translate them directly into query languages such as SQL. These systems often rely on predefined templates or rigid parsing rules, which can struggle with the ambiguity and variability inherent in natural language. As a result, these solutions can produce queries that are either syntactically incorrect or semantically misaligned with the user's original intention. Additionally, these approaches frequently require substantial preprocessing of the data or schema to fit the narrow confines of the system's understanding, limiting flexibility and scalability.

Machine learning algorithms have been deployed to improve the interpretation of natural language inputs, offering increased adaptability and learning from interactions to improve over time. However, these approaches often require extensive training data to become effective, posing a significant barrier due to the need for a comprehensive dataset that encompasses the variety of ways users might phrase their queries. Moreover, these machine learning-based solutions tend to operate as black boxes, providing little transparency or insight into how they generate queries, complicating troubleshooting and refinement.

Existing methodologies frequently overlook the critical aspect of data privacy and security. In their bid to accurately interpret and translate natural language input, these systems might necessitate broad access to the underlying data or metadata, potentially exposing sensitive information or violating privacy regulations. This raises data privacy and security concerns, as sensitive business data is exposed to third parties. Existing systems are often designed to work with a specific type of database or data store, limiting their applicability in heterogeneous data environments.

Businesses and organizations continue to face substantial barriers to effective and efficient data utilization, highlighting the need for an innovative approach. There is a clear necessity for a system capable of accurately interpreting natural language inputs, adaptable to diverse database schemas, and cognizant of the imperative to safeguard data privacy. Despite the evolution of data management technologies and methodologies, these challenges underscore the necessity for an innovative approach capable of addressing these limitations and enhancing the efficiency and effectiveness of data retrieval and utilization.

SUMMARY

Systems and methods in accordance with the embodiments described herein overcome various deficiencies in existing approaches to database queries. In particular, various embodiments utilize a stateless structure engine for querying databases using natural language prompts while preserving data privacy and ensuring accurate query execution. The stateless structure engine utilizes data models (e.g., an entity-relational (ER) diagram) to guide a query generation system in generating executable query code to retrieve precise results without exposing user data to third parties. This system emphasizes query simplification, ensuring that users with minimal database knowledge can effectively generate and use database queries.

For example, when an individual (referred to as a "user") desires to retrieve data from a database or network of databases, a query-wise stateless structure engine (QSSE) or other such system facilitates this interaction. Instead of requiring the user to understand complex database structures or query languages, the user and the system engage in a simplified, user-friendly process.

In an embodiment, the QSSE or other such system receives a natural language query (also referred to as a natural language question) from a user and translates it into an executable query using a structured approach. Initially, the natural language query is abstracted into a generalized form that captures the user's intent while abstracting out specific parameters. This abstracted query is then converted into an expression that represents the query logic in a standardized format, independent of any particular database or API.

The standardized expression can be used to identify a pre-defined data recipe that specifies the steps and functions needed to generate an executable query for the user's specific data environment. The data recipe is selected based on various factors, including query complexity, expected data retrieval patterns, and system performance metrics. Once the appropriate data recipe is identified, it is used to generate the executable query commands tailored to the target database environment.

The query generation system interacts with a query optimization system or other appropriate system to refine and optimize the generated executable queries. The query optimization system may employ a series of techniques to analyze the queries for efficiency and accuracy, ensuring that the final execution plan minimizes resource consumption and maximizes performance. By leveraging these optimization techniques, the system ensures that the queries are executed in the most efficient manner possible, thereby reducing latency and improving overall query performance.

The query generation system interacts with a client-side agent deployed in the user's local data environment. This agent receives the executable query from the query processing system and executes it against the user's local database or API. The results are then returned to the user, ensuring that the user's data remains within their local environment and is not exposed to the query processing system or any other third party.

Accordingly, in various embodiments, the approaches described herein allow for the simplified and efficient retrieval of database information in various forms, including between different database systems and across different sectors that require reliable data access. The embodiments described herein are adaptable for a wide range of applications, transcending traditional barriers of complexity and user skill level in database querying.

Advantageously, the systems and methods disclosed herein improve upon existing database query processes by providing data access and query simplification. Conventional systems often necessitate an understanding of complex query languages and database structures, increasing the risk of inefficient data retrieval. In contrast, the present system utilizes a query-wise stateless structure engine to abstract complex database interactions and simplify query generation.

Data privacy is preserved as the user's data remains in their local environment and is not uploaded to the cloud or exposed to third parties. The system is data-source agnostic, capable of generating executable queries for various data platforms, including SQL databases, NoSQL stores, object stores, and APIs. Query accuracy and relevance are improved through the use of pre-defined data recipes that encode best practices for common query patterns.

Additionally, the system optimizes query performance by leveraging query abstraction and predefined data recipes, reducing response times and enhancing the overall efficiency of data retrieval. Further technical benefits include the system's ability to dynamically adapt to varying operational conditions, such as network latency and database load, ensuring consistent performance.

Further yet, the approaches improve efficiency and adaptability across various database platforms and configurations. The system's ability to understand and translate user inputs into effective queries facilitates interactions with databases, removing the need for repetitive and complex query syntax construction. This efficiency is particularly beneficial in environments requiring rapid and frequent data access, streamlining operations without compromising precision or flexibility.

Moreover, the approaches offer benefits in terms of reducing operational costs and enhancing data governance. By automating the query generation process and minimizing the need for specialized training in query languages, the system can significantly decrease the costs associated with data management. The intuitive and guided nature of the query process also enhances compliance with data governance policies and standards, further enhancing its applicability and utility in a wide range of industries.

Furthermore, the system incorporates an optimization component that scrutinizes and refines the generated queries to ensure they are optimized for performance, addressing the issue of inefficient queries that can lead to unnecessary processing time and resource consumption.

Additionally, the system incorporates components that offer a tailored approach to database querying, responding to the nuanced requirements of diverse data-driven contexts. By generating targeted queries based on real-time user inputs and predefined prompts, the system ensures that the queries-reflecting accurate and necessary data retrieval—are precisely aligned with the user's needs. This approach not only reinforces data access efficiency but also enhances the overall experience and performance of the database systems, optimizing interactions and outcomes.

Privacy and data security are also prioritized within this system. Unlike other approaches that may require extensive access to the underlying data for query generation, this invention operates on a principle of data minimalism, where only essential information—the "entities"—is utilized. This distinctive approach not only enhances the system's privacy safeguards but also aligns it with data protection regulations, offering a solution that is both effective and respectful of user privacy concerns.

Various other functions and advantages are described and suggested below as may be provided in accordance with the various embodiments.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1A:
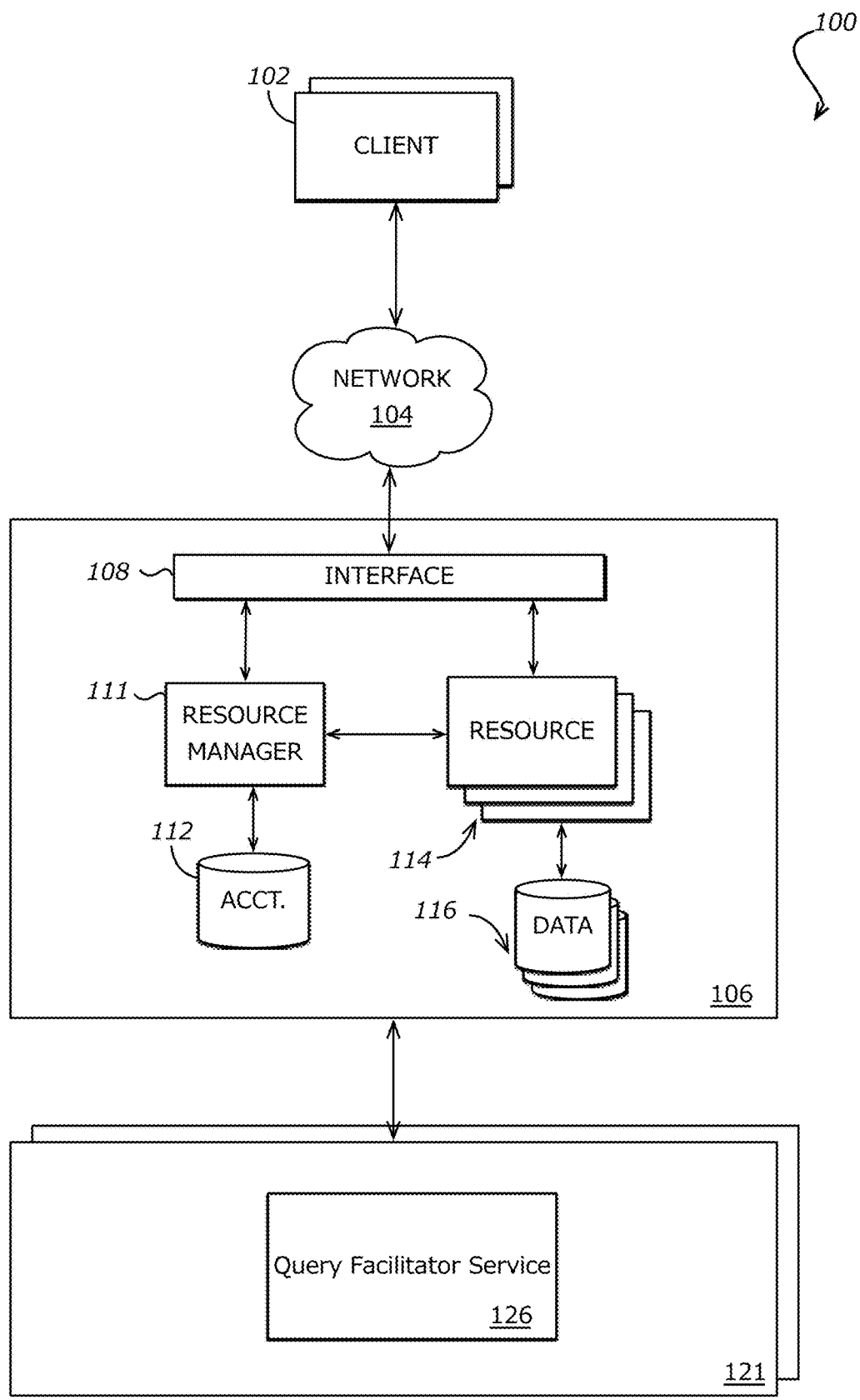
FIG. 1A illustrates an example environment in which aspects of the various embodiments can be implemented.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conceptual Architecture

FIG. 1A illustrates an example environment 100 in which aspects of the various embodiments can be implemented. In this example, a user can utilize a client device 102 to communicate across at least one network, for example, network 104, with a resource provider environment 106. The client device 102 can include any appropriate electronic device operable to send and receive requests, or other such information over an appropriate network, and convey information back to a user of the device. Examples of such client devices include personal computers, tablet computers, smartphones, notebook computers, and the like. The user can include a person authorized to manage aspects of the resource provider environment.

The network 104 may comprise a variety of forms such as intranets, the Internet, cellular networks, and local area networks (LANs). These networks facilitate communication that can be enabled through both wired and wireless means, ensuring seamless interaction within the database querying ecosystem, which leverages the capabilities of the query facilitator service 126 to enhance efficiency and accessibility. This intricate network web supports the data exchanges necessary for the operation of the query facilitator service 126 and other related systems and components.

The resource provider environment 106 includes the query facilitator service 126, configured to enhance efficiency and user-friendliness during database query processes. This service utilizes advanced algorithms to interpret and transform user inputs into actionable database commands, employing a stateless structure engine and a query generation system (e.g., a large language model (LLM) or other appropriate system) to dynamically generate database queries. It is designed for ease of use by abstracting complex query syntax into more accessible interactions and supports secure and efficient data retrieval across various platforms and user interactions.

In certain embodiments, the query facilitator service 126 enables users to interact with databases without needing detailed knowledge of query languages. This service may include systems such as a database management system, comprised of data processing units and query optimization systems. These components facilitate the creation and management of queries, ensuring that data retrieval is both efficient and accurate. The query facilitator service 126 is part of a larger framework that includes various resources such as application servers 114, which process instructions, and database servers 116, which manage data storage and retrieval.

The query facilitator service 126 can include or be in communication with one or more other components/services, which support the operation and management of database queries. These components may be hosted on multiple server computers and/or distributed across multiple systems. The service architecture is designed to scale according to demand and can be implemented using any number of different computers and/or systems, thus ensuring robustness and resilience.

The servers in the environment, which may include web and application servers, work in tandem with query facilitator service 126 to process requests securely. This may involve leveraging multi-factor authentication methods to ensure authorized access to database information, thereby reinforcing user control over data.

In at least some embodiments, an application executing on the client device 102 that needs to access resources of the resource provider environment 106, for example, to manage query facilitator service 126, implemented as one or more services to which the application has subscribed, can submit a request that is received to interface layer 108 of the resource provider environment 106. The interface layer 108 can include application programming interfaces (APIs) or other exposed interfaces, enabling a user to submit requests, such as Web service requests, to the resource provider environment 106. Interface layer 108, in this example, can also include a scalable set of customer-facing servers that can provide the various APIs and return the appropriate responses based on the API specifications. Interface layer 108 also can include at least one API service layer that, in one embodiment, consists of stateless, replicated servers that process the externally-facing customer APIs. The interface layer can be responsible for Web service front-end features such as authenticating customers based on credentials, authorizing the customer, throttling customer requests to the API servers, validating user input, and marshaling or unmarshaling requests and responses. The API layer also can be responsible for reading and writing database configuration data to/from the administration data store, in response to the API calls. In many embodiments, the Web services layer and/or API service layer will be the only externally visible component or the only component that is visible to and accessible by customers of the control service. The servers of the Web services layer can be stateless and scaled horizontally, as known in the art. API servers, as well as the persistent data store, can be spread across multiple data centers in a region, for example, such that the servers are resilient to single data center failures.

When a request to access a resource is received at the interface layer 108 in some embodiments, information for the request can be directed to resource manager 111 or other such systems, service, or component configured to manage user accounts and information, resource provisioning and usage, and other such aspects. Resource manager 111 can perform tasks such as to communicate the request to a management component or other control component which can manage distribution of configuration information, configuration information updates, or other information for host machines, servers, or other such computing devices or assets in a network environment, authenticate an identity of the user submitting the request, as well as to determine whether that user has an existing account with the resource provider, where the account data may be stored in at least one data store 112 in the resource provider environment 106. The resource manager can, in some embodiments, authenticate the user in accordance with embodiments described herein based on voice data provided by the user.

A host machine 121 in at least one embodiment can host query facilitator service 126. It should be noted that although host machine 121 is shown outside the provider environment, in accordance with various embodiments, query facilitator service 126 can be included in resource provider environment 106, while in other embodiments, one or the other can be included in the resource provider environment. In various embodiments, one or more host machines can be instantiated to host such systems for third-parties, additional processing of preview requests, and the like.

Figure 1B:
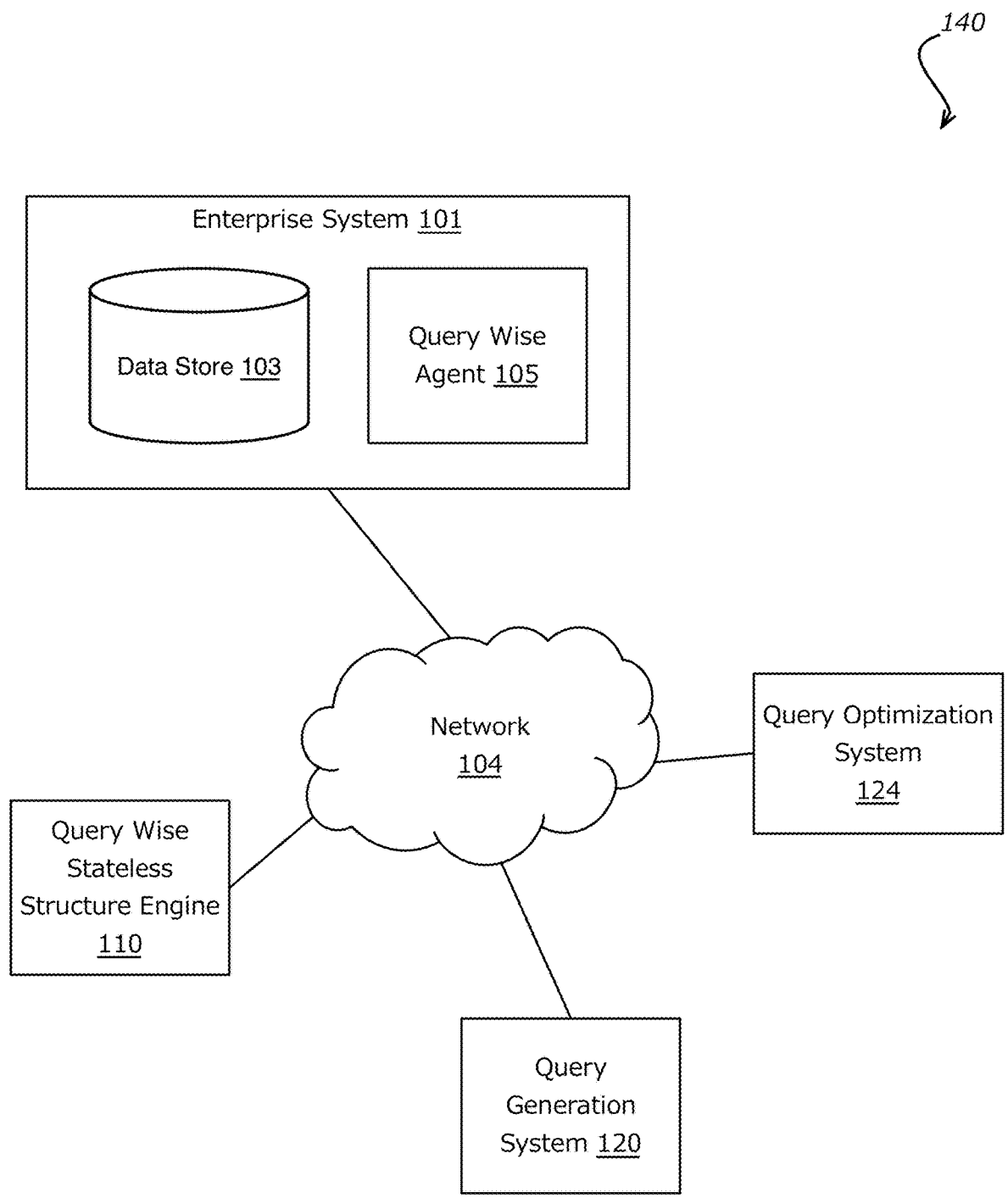
FIG. 1B illustrates a system for facilitating database queries in accordance with various embodiments.

FIG. 1B illustrates a system 140 for facilitating database queries in accordance with an exemplary embodiment of the invention. The system comprises an enterprise system 101, a query wise stateless structure engine 110, a query generation system 120, a query optimization system 124, and a network 104. The enterprise system 101 may comprise a data store 103 and a query wise agent 105. These elements are configured to cooperate in processing and facilitating efficient and effective database query operations across various user interfaces and network configurations.

The enterprise system 101 may be associated with an entity, such as a business, organization, company, or group. Users may utilize user devices, including laptops, smartphones, desktop computers, tablets, and wearable computing devices, to access the enterprise system 101. Generally, the enterprise system 101 enables user devices associated with the entity to communicate and/or execute software. More specifically, the data store 103 within the enterprise system 101 stores data relevant to the entity's operations. In one embodiment, this data may be organized within a relational database, such as a Structured Query Language (SQL) database, and is accessible through queries, including SQL queries. In an illustrative example, consider a retail company utilizing the enterprise system 101 to manage inventory and customer relations. Employees access this system through various devices such as laptops, tablets, and smartphones, each connected to the enterprise system via network 104. Within the enterprise system 101, the data store 103 maintains a structured relational database, managed using SQL, that includes essential data tables covering inventory, customer data, sales transactions, and supplier information. For instance, when a sales representative needs to verify the availability of a product, they may input a SQL query from their tablet. This query is communicated to the enterprise system 101 where the query wise agent 105, using stored credentials, facilitates the authentication and execution of the query against the data store 103. Subsequently, the requested inventory data is retrieved and transmitted back to the representative's tablet, displaying current stock levels, locations, and quantities.

In an exemplary embodiment, query wise agent 105 serves as a communication gateway within the enterprise system 101, bridging interactions between the query wise stateless structure engine 110 and various user devices linked to the system. Query wise agent 105 includes credentials to access the data store 103, thus it manages the authentication process, allowing it to relay queries from the query wise stateless structure engine 110 to both the enterprise system 101 and its connected devices without the engine itself requiring direct access to these credentials. This arrangement obviates the need for the query wise stateless structure engine 110 to hold direct credential access, streamlining the query handling process. Further, query wise agent 105 also undertakes direct query execution on the data store 103. It receives queries from the query wise stateless structure engine 110, processes them according to the structured query protocols, and retrieves the requested data. Additionally, in various embodiments, query wise agent 105 comprises memory that houses a vector database. This database stores embeddings of specific data, intricately linked to the entity's operational ecosystem. For example, these embeddings could represent data patterns or metadata that enhance the efficiency and relevance of query results, supporting sophisticated data analysis and decision-making processes. In one embodiment, these capabilities allow the query wise agent 105 to not only handle requests for data retrieval more effectively but also support advanced data operations such as predictive analytics and contextual data responses, which are integral to dynamic business environments. In accordance with an example use, the interplay of the query wise agent 105 with the query wise stateless structure engine 110 and the data store 103 illustrates a layered functionality where queries are managed and executed efficiently, supporting real-time data interactions and complex data processing tasks.

Query wise stateless structure engine 110 comprises one or more computing devices and functions primarily as an interface between the enterprise system 101 and the query generation system 120. As will be discussed in more detail in reference to FIG. 2, generally, the query wise stateless structure engine 110 facilitates interactions between users of the enterprise system 101 and data store 103, particularly catering to users who may not be proficient with the specific structure or querying language of the data store.

More specifically, the query wise stateless structure engine 110 abstracts the complexity involved in formulating queries by translating user inputs into the appropriate query language. In one embodiment, a user might input a natural language request, such as "show all transactions from the last quarter," which the query wise stateless structure engine 110, along with other components and systems, processes and converts into a structured SQL query capable of retrieving the relevant data from data store 103. In this manner, the query wise stateless structure engine 110 not only simplifies user interaction with complex database systems but also enhances accessibility and efficiency. For example, in a scenario where a marketing analyst seeks specific customer engagement metrics, they could input a simple request via a user interface linked to the query wise stateless structure engine 110. The engine, upon determining the intent and necessary data points, formulates the query without the user needing to know SQL or the specific schema of the database.

In various embodiments, when a user submits a natural language query, the query is directed towards interacting with one or more databases that are accessible by the user. This architecture ensures that while the user can retrieve and manipulate data, the underlying data remains secure and under the user's control.

In various embodiments, the data maintained within these databases remains separate from the systems described herein. This separation ensures that the user's data remains within their control and is neither stored nor directly processed by the central systems described herein. Instead, the central systems interact with the data through secure, indirect means.

In one embodiment, the separation of data is physical. The databases can be hosted on infrastructure or servers that are not shared with or accessible by the central systems. This physical infrastructure may be located onsite at the user's premises or hosted remotely via a dedicated service provider, ensuring that data residency and sovereignty requirements are fully adhered to.

In another embodiment, electronic separation is maintained by ensuring that data transmission between the user's databases and the central systems occurs over secure, encrypted channels. These channels are designed to only transfer necessary metadata or data models without transferring the actual data itself. Such arrangements ensure compliance with privacy standards and regulations, minimizing data exposure.

In an embodiment, the data maintained by the user includes data entities, attributes, and relationships stored across their operational databases. This data might encompass sensitive business information, personal data subject to regulatory protections, or proprietary content requiring stringent access controls. For scenarios where the user opts for an on-premise deployment of at least some of the systems described herein, the system architecture is designed to operate within the user's IT environment. This setup allows the functionalities of the invention to be utilized without migrating sensitive data outside the secure premises of the user's infrastructure.

In various embodiments, although the systems described herein do not directly access actual data, they receive data models that describe the structure and schema of the user's databases. These models enable the system to understand and interact with the user's data indirectly, facilitating the generation of optimized queries without requiring direct access to the actual data. For example, a natural language query submitted by the user is processed by the query-wise stateless structure engine (QSSE) to generate an abstracted query and a corresponding standardized expression. This standardized expression is then used to identify and generate optimized executable queries, which are sent to a client-side agent. The client-side agent, deployed within the user's local environment, executes the queries against the local databases and returns the results to the user, ensuring that the actual data never leaves the user's secure environment.

In an embodiment, the query wise system is operable to facilitate database querying through a client-side agent and a remote server. The client-side agent, e.g., query wise agent 105, operates on-premise for each client. For example, query wise agent 105 operable on enterprise system 101. As described herein, it includes a query system and an execution system. The query system handles direct user interactions and reformulates natural language questions into abstract queries, querying the planning system for recipes that answer user queries. Such an approach enables a chat-like user experience and can split a single user chat into multiple queries if the content is sufficiently unrelated. The execution system executes data recipes on-premise, manages error feedback, and sends execution results back to the query system. Outbound requests, in certain embodiments, pass through a server, logging requests and associating them with user queries to enhance security.

A remote server executing query wise stateless structure engine 110 communicates with query wise agent 105. It includes a planning system and a plugin system. The planning system generates and retrieves recipes that answer user natural language questions, matching abstract queries to existing recipes and formulating new descriptions of functions for plugins when necessary. The plugin system generates and retrieves plugins and functions used by the planning system. Each data source corresponds to a data plugin, while additional generic plugins handle data transformation and predictive modeling.

In various embodiments, the system is designed to ensure that user data remains secure and private by in various embodiments restricting direct access to the underlying databases from the central processing components. Specifically, a database that is accessible by the user but not directly accessible by the computing device that obtains the natural language query enhances data privacy and security.

In various embodiments, the system is designed to handle data sets that are maintained across multiple disparate data stores, where the data is stored in a non-standardized format and not correlated. This means that the data within each data store can have different structures, schemas, and formats, making direct querying and data retrieval complex and inefficient. For instance, one data store might use a relational database structure with SQL, while another could use a NoSQL format, and yet another might store data in flat files or spreadsheets. Additionally, the data across these stores is not inherently linked or correlated, meaning that there are no predefined relationships or mappings between the data sets. This lack of standardization and correlation necessitates advanced methods for querying, where the system must first abstract and translate user queries into a form that can navigate these disparate formats and structures to retrieve the desired data efficiently.

When a user interacts with the system, they input natural language queries through a user interface. The natural language query is received by the query-wise stateless structure engine (QSSE) or other such system, which processes the query without directly accessing the underlying database where the data resides. Instead, the QSSE abstracts and translates the user's query into a format that can be processed further without exposing the actual data or structure of the database.

The actual data retrieval is performed by a client-side agent, which is deployed within the user's local data environment. This agent has direct access to the user's database and executes the executable query generated by the query generation system. By deploying the client-side agent locally, the system ensures that the user's data never leaves their secure environment, thus preventing unauthorized access by the central processing components.

For example, when a user submits a natural language query to retrieve customer transaction data, the QSSE processes the query to generate an abstracted query representation and a corresponding standardized expression. This expression is used to identify and generate an optimized executable query. The executable query is then sent to the client-side agent, which runs the query against the local database and returns the results to the user. At no point does the central system have direct access to the underlying customer data, maintaining strict data privacy and security.

In certain embodiments, query wise stateless structure engine 110 can facilitate more complex data operations. In another embodiment, the engine could automatically generate queries based on user behavior or predefined criteria, such as automatically fetching inventory levels when they fall below a certain threshold, thus aiding in proactive inventory management. In yet another embodiment, the operation of the query wise stateless structure engine 110 is characterized by its ability to interact seamlessly with the Query generation system 120, which might enhance query formulation or even generate predictive analytics based on the data fetched. For instance, after retrieving sales data, the Query generation system 120 could analyze trends and provide forecasts directly to the user through the same interface.

In accordance with an example use, query wise stateless structure engine 110 operates in concert with the query wise agent 105 to handle authentication and secure data transfer, ensuring that queries are not only effectively generated but also securely executed. This interaction exemplifies how various components within the enterprise system 101 collaborate to provide a cohesive and secure user experience, facilitating data management and insightful analytics without extensive technical knowledge from the user.

Query generation system 120 is configured to compile executable database commands from data recipes (e.g., SQL query templates, NoSQL command sets, and pre-aggregated data retrieval scripts) that are selected and provided by the query wise stateless structure engine 110. In general, query generation system 120 translates the structured expressions into actual database operations that execute efficiently across various data stores.

For example, upon receipt of an optimal data recipe from the query wise stateless structure engine 110, which has already processed and matched structured expressions to these recipes based on the query's requirements and system performance metrics, query generation system 120 begins its operation. In this example, query generation system 120 obtains the selected data recipe, which details specific query templates optimized for execution, and assembles them into executable code tailored to the target database environment.

In an embodiment, this assembly process involves converting the high-level instructions contained in the data recipe into specific SQL or NoSQL commands, depending on the database architecture in use. During this transformation, query generation system 120 applies algorithms to ensure that the executable commands are not only syntactically precise but are also optimized for factors such as execution speed, resource utilization, and load balancing.

In an embodiment, query generation system 120 utilizes lookup tables to expedite the generation of executable code. These lookup tables contain mappings of standardized expressions to specific database commands or query fragments. By referencing these tables, query generation system 120 can assemble the required commands, ensuring consistency and efficiency. For instance, a lookup table might map the standardized expression "retrieve sales data" to predefined SQL snippets that fetch sales data from various tables and apply necessary joins and filters.

Additionally or alternatively, query generation system 120 employs trained models, including large language models (LLMs), to process and convert structured expressions into executable code. These models analyze the structured expressions and generate syntactically accurate and semantically appropriate commands, such as SQL queries. In an embodiment, the models optimize the generated commands based on performance metrics, ensuring efficient execution. For example, an LLM might take a structured expression and generate an optimized SQL query that minimizes execution time by leveraging database indexes and optimizing join operations.

Other techniques used by query generation system 120 to generate executable code include deterministic algorithms that apply rules-based transformations to structured expressions. These transformations map data requests to database schema elements using pre-defined syntactic templates aligned with the data model and query performance optimization strategies. For instance, a deterministic algorithm might convert a structured expression into a sequence of database operations, ensuring efficient data retrieval through predefined query templates and optimization rules.

In an embodiment, query generation system 120 dynamically modifies the execution strategies based on real-time analysis of network conditions, database loads, and other external factors. This dynamic adaptation maintains optimal performance and responsiveness under varying operational conditions, ensuring that data retrieval and manipulation tasks are executed without undue delays or resource strain.

In an embodiment, the plugin system within the query wise architecture is responsible for generating new code for functions and storing pre-written functions and schemas relevant to the plugin scope. Each client data source corresponds to a data plugin, while generic plugins handle data transformation, predictive modeling, and other functionalities. In various embodiments, aspects of the plugin system include function granularity, where each function performs a specific task described in a single sentence, ensuring alignment with the natural language interface of the planner system. Validation ensures that generated functions are syntactically correct, interact properly with data types, and adhere to security constraints. Feedback mechanisms allow query wise systems and client engineers to inspect functions and provide feedback, including scoring and commenting on security risks or errors. By implementing these techniques, the plugin system enhances the flexibility and adaptability of the query wise architecture, ensuring it can meet a wide range of data processing needs.

In an embodiment, query generation system 120 integrates predictive analytics to pre-emptively adjust queries based on anticipated database demands. For example, during expected high-demand periods like sales events or financial closings, query generation system 120 schedules data-intensive query operations during off-peak hours and enhances data caching strategies to expedite query processing.

In accordance with an example use, consider a scenario where a supply chain manager requests real-time inventory data. Query generation system 120 receives the corresponding data recipe from the query wise stateless structure engine 110, which has already identified this recipe as the most efficient for querying inventory levels. Query generation system 120 then generates the necessary SQL commands that efficiently query and aggregate inventory data across multiple warehouses. The results are formatted into structured outputs, providing clear and actionable insights for inventory management.

In an embodiment, the query generation system employs techniques such as Structured Chain of Thought (SCOT), Tree of Thought (ToT), and Graph of Thought (GoT). SCOT utilizes structured thought processes to generate and refine query plans, ensuring logical consistency and optimizing performance. ToT explores various branches of query execution plans to identify the most efficient path, while GoT maps out potential query execution strategies in a graph format, allowing the system to evaluate multiple execution paths simultaneously. These techniques contribute to the dynamic and efficient generation of executable queries tailored to diverse database environments and user requirements.

Query optimization system 124 is operable to define and optimize the queries generated by query wise stateless structure engine 110 or other appropriate component, using artificial intelligence algorithms and other such techniques. This optimization process aims to improve both the efficiency and accuracy of queries processed within the network 104.

More specifically, query optimization system 124 utilizes a combination of machine learning models and heuristic algorithms to analyze and refine queries before they are executed against data store 103. In one embodiment, Query optimization system 124 leverages pre-trained models such as neural networks that have been conditioned on datasets comprising diverse query types and structures to predict the most efficient execution plans for incoming queries. In this scenario, once a query is received from, e.g., query wise stateless structure engine 110, query optimization system 124 parses the query to understand its structure and intent. Subsequently, query optimization system 124 evaluates various execution strategies and selects the one that minimizes resource usage and maximizes retrieval speed. In such a case, the optimization process may involve rewriting the query or reordering its components to better align with the underlying database architecture.

For example, if a user submits a complex query involving multiple joins and subqueries, query optimization system 124 could rearrange the joins based on the sizes of the tables involved or apply query simplification techniques to reduce computational overhead. Similarly, for a query requiring data aggregation, query optimization system 124 might introduce parallel processing directives to expedite result compilation.

In accordance with an example use, consider a scenario where an enterprise requires real-time data analysis during peak business hours. Query optimization system 124 receives streaming queries from user devices via query wise agent 105 and optimizes them for execution. This rapid optimization allows the enterprise to handle a higher volume of queries without degrading system performance, thereby maintaining operational efficiency during critical periods.

Network 104 generally represents a network or collection of networks (such as the Internet or a corporate intranet, or a combination of both) over which the various components illustrated in FIG. 1B (including other components that may be necessary to execute the system described herein, as would be readily understood to a person of ordinary skill in the art). In particular embodiments, network 104 is an intranet, an extranet, a virtual private network (VPN), a local area network (LAN), a wireless LAN (WLAN), a wide area network (WAN), a metropolitan area network (MAN), a portion of the Internet, or another network 104 or a combination of two or more such networks. One or more links connect the systems and databases described herein to the network 104. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network, and any suitable link for connecting the various systems and databases described herein.

The network 104 connects the various systems and computing devices described or referenced herein. In particular embodiments, network 104 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. The present disclosure contemplates any suitable network.

One or more links couple one or more systems, engines or devices to the network 104. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 104.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1B, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
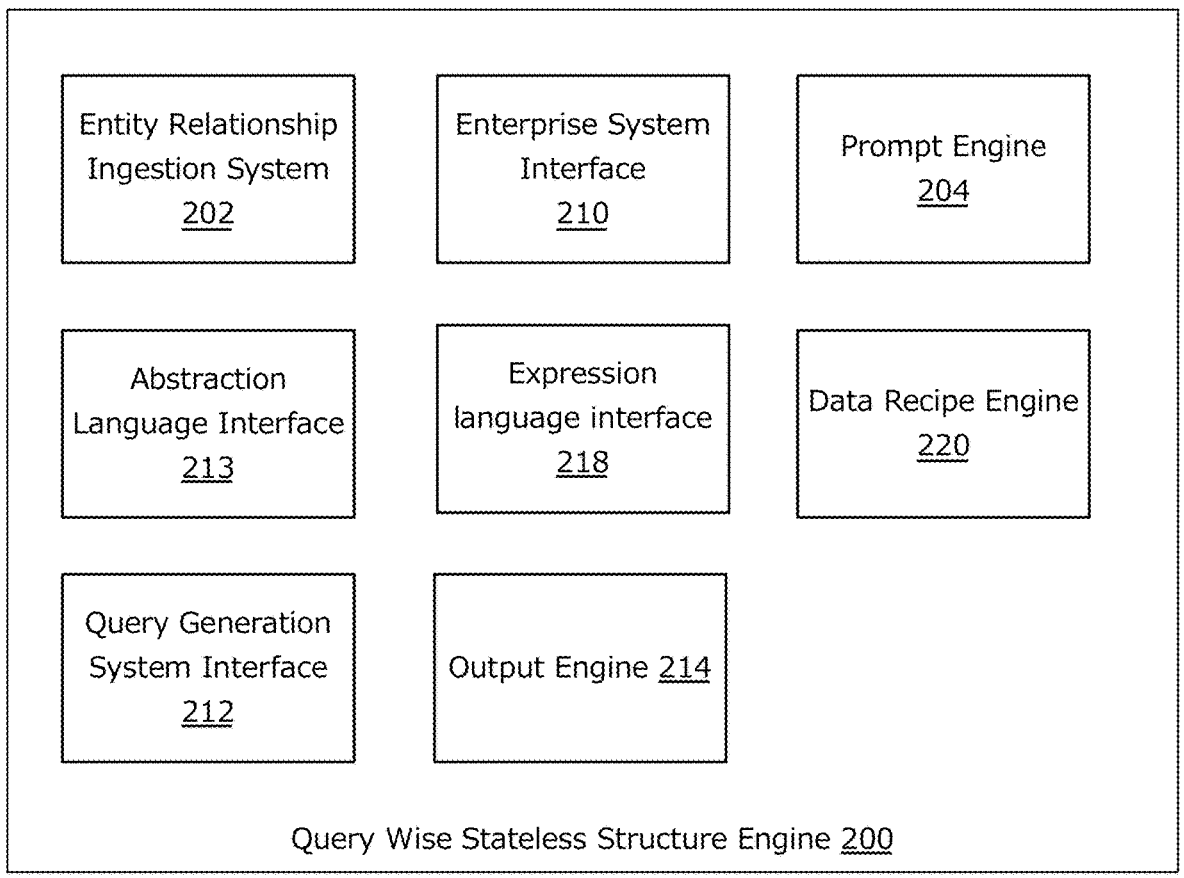
FIG. 2 illustrates an example computing environment including a query wise stateless structure engine in accordance with an exemplary embodiment.

FIG. 2 illustrates an example computing environment in accordance with an exemplary embodiment of the present invention. The computing environment may comprise a query wise stateless structure engine 200, such as the query wise stateless structure engine 110 in FIG. 1B. The computing environment may comprise one or more servers. The computing environment may comprise a cloud computing environment. The query wise stateless structure engine 200 may comprise an entity relationship ingestion system 202, an enterprise system interface 210, an abstraction language interface 213, an expression language interface 218, a data recipe engine 220, a prompt engine 204, a query generation system interface 212, and an output engine 214.

The entity relationship ingestion system 202 is operable to process entity-relationship (ER) diagrams received from enterprise systems. In an embodiment, ER diagrams delineate how data is organized within a data store of an associated enterprise system, thus forming the foundational data model upon which subsequent query processes are built. More specifically, entity relationship ingestion system 202 facilitates the adaptation of ER diagrams into a format that can be utilized by the query wise stateless structure engine 200.

In one embodiment, entity relationship ingestion system 202 comprises instructions configured to interpret and transform ER diagrams into structured data representations that are readily processable by other components of the engine. These transformations align external data structures with the internal processing capabilities of the system. For example, an ER diagram detailing customer and transaction tables might be received. Entity relationship ingestion system 202 could parse this diagram to identify key relationships and constraints that need to be maintained during query operations. Similarly, another example involves entity relationship ingestion system 202 receiving an ER diagram with complex many-to-many relationships, which are then simplified into more manageable associations that can be more readily queried by non-expert users.

In various embodiments, entity relationship ingestion system 202 interacts with Application Programming Interfaces (APIs) conforming to the OpenAPI Specification or other appropriate specifications. This interaction enables entity relationship ingestion system 202 to integrate with external data management systems, allowing for dynamic data exchange and synchronization. More specifically, in accordance with an embodiment, entity relationship ingestion system 202 can dynamically query external APIs to retrieve or update data definitions as per the evolving enterprise data architecture, ensuring that the query processing engine always has access to the most current data schema.

Further, in some embodiments, entity relationship ingestion system 202 utilizes a client library to facilitate communication with the APIs. This library includes predefined functions and procedures that abstract the complexity of direct API calls, providing a simplified interface for data model updates and retrieval. This reduces the need for custom coding and accelerates the integration process with various data sources.

In accordance with an example use, entity relationship ingestion system 202 might receive an updated ER diagram reflecting a new marketing campaign's data structure. Entity relationship ingestion system 202 processes this diagram to update internal data models and then pushes these updates through enterprise system interface 210 to the other modules of the query wise stateless structure engine 200. In an embodiment, entity relationship ingestion system 202 helps to ensure that all related query processes are aware of the new data structures, thus maintaining consistency and accuracy in the query outputs.

Enterprise system interface 210 facilitates the transmission and reception of data and queries across network 104, ensuring that information flows efficiently between the internal components of the query wise stateless structure engine 200 and external devices or systems. More specifically, enterprise system interface 210 operates by receiving information from various modules of the engine and converting this information into a structured format that adheres to an expression language designed for interpretation and execution by the system. In an embodiment, this might include handling data structures such as entity-relationship (ER) diagrams, which outline the data architecture within the enterprise system, along with other operational data used to maintain the functionality and responsiveness of the enterprise system.

For example, enterprise system interface 210 may receive an ER diagram from the entity relationship ingestion system 202 that includes multiple layers of relationships and dependencies. The interface translates this ER diagram into an expression format that defines these relationships into a series of logical expressions that can be processed by other components of the system, such as the data recipe engine 220 or the prompt engine 204. This translation might involve converting a multi-table join diagram into a single expression that encapsulates the necessary joins and filters while adhering to the system's internal query optimization protocols. Similarly, another example involves the interface receiving real-time operational data from the output engine 214, such as live transaction records or user interaction logs. The enterprise system interface 210 processes this data by encapsulating it into expressions that summarize key operational metrics or performance indicators. These expressions are then transmitted back to the enterprise system 101, where they can be used to update dashboards, trigger alerts, or inform decision-making processes. For instance, if the output engine 214 detects a spike in transaction volume, the enterprise system interface 210 could generate an expression like "SUM (transactions) OVER (LAST_HOUR) >THRESHOLD," which directly informs system monitors or automated response systems within the enterprise.

In various embodiments, enterprise system interface 210 receives signals from network 104 that originate from enterprise system 101. These signals could represent queries generated by external users or systems, or feedback data on previously executed queries. More specifically, in accordance with an embodiment, enterprise system interface 210 processes these incoming signals to extract relevant information and redistributes this to appropriate components within the query wise stateless structure engine 200, such as forwarding a user-generated query to the prompt engine 204 for processing.

Further, enterprise system interface 210 is operable to direct communication tasks such as transmitting refined queries back to the enterprise system 101. This includes queries that have been optimized and validated by other components like the query optimization system, ensuring that the queries are both efficient and compliant with enterprise standards.

In accordance with an example use, enterprise system interface 210 might handle a situation where an urgent update is required in the data processing logic due to a sudden change in business operations. In this scenario, the interface would receive a modified query from the query generation system interface 212, which reflects the new business requirements. Enterprise system interface 210 would promptly format and transmit this query across network 104 to the enterprise system 101, ensuring that the enterprise's data systems are quickly updated to reflect the new operational priorities.

The prompt engine 204 is operable to facilitate interactive and dynamic query formulation for use by the query generation system 120. Generally, prompt engine 204 generates structured prompts tailored to specific user needs and contexts, enhancing the natural language processing of the system. More specifically, it creates prompts that include various elements designed to specify and guide the query generation process effectively.

In one embodiment, the prompt may incorporate a role or persona, reflecting an occupation familiar with a specific programming language and/or computing environment, ensuring that the generated queries align with the user's operational requirements and knowledge base.

In an embodiment, prompt engine 204 might generate a prompt for a database administrator that includes SQL command structures tailored to optimize database performance. This prompt could be structured as a request to "Identify and index all unindexed foreign keys in large tables to improve join operations," which the query generation system 120 interprets to generate an SQL script that automatically scans for and indexes these keys, directly executable within the database management system. Conversely, a prompt for a marketing analyst might focus on data retrieval commands for analyzing customer engagement metrics. In this scenario, prompt engine 204 could generate a prompt such as "Calculate the average customer engagement score for the new product launch by region," directing the query generation system 120 to formulate a complex SQL query that aggregates customer interaction data across different geographic segments, providing actionable insights on the product's market performance. Similarly, another example involves prompt engine 204 preparing prompts that include actions to be taken, such as writing a function. For instance, it might generate a prompt requesting the creation of a JavaScript function that calculates real-time shipping costs based on user cart contents and shipping destination. This function would guide the query generation system 120 in generating a script that can be directly embedded into the e-commerce platform, dynamically calculating shipping costs during the checkout process, enhancing user experience by providing immediate cost calculations.

In various embodiments, prompt engine 204 integrates dynamic elements within the prompts that adapt based on real-time user input. This dynamic portion of the prompt can be completed or modified as the user interacts with the system, providing a flexible and responsive query formulation process. More specifically, the prompt may comprise a predefined, partially complete portion that outlines the basic structure of the query, while the dynamic portion allows for the inclusion of specific details that are only available at the time of the query, such as the exact data fields to be retrieved. For example, in a use case involving a financial analyst, the prompt engine 204 might initially generate a basic prompt for querying quarterly sales data. The predefined portion of the prompt could look like this: "Retrieve total sales from Q_for the following products:". Here, "Q_" represents a placeholder where the specific quarter needs to be specified, and the product list is left dynamic for user input. As the financial analyst interacts with the system, they specify that they are interested in "Q2" and want to see sales data for "Product A, Product B, and Product C." The dynamic portion of the prompt is then completed in real-time, filling in the specified quarter and product names. The fully formed prompt sent to the query generation system 120 would then be: "Retrieve total sales from Q2 for Product A, Product B, and Product C." This dynamically completed prompt allows the query generation system 120 to generate a precise SQL query that fetches the sales data for the specified quarter and products.

Further, prompt engine 204 interacts with other components of the query wise stateless structure engine 200 to ensure that the prompts it generates are effectively processed and converted into formal queries by the query generation system. In an embodiment, the interaction between the prompt engine 204 and the query generation system interface 212 helps to ensure that the prompts are transmitted efficiently and the responses from the query generation system are accurately interpreted and utilized. For example, in the situation where an operational manager needs to analyze equipment failure rates across multiple manufacturing sites to identify patterns and predict potential downtimes. The prompt engine 204 generates a query prompt based on this requirement. The prompt could initially be structured as: "Generate a report on equipment failure rates per site for the past year." As the operational manager interacts with the system, specifying that they are particularly interested in sites with above-average failure rates, the prompt engine 204 dynamically adjusts the prompt to include this additional filtering criterion. The updated prompt could then read: "Identify manufacturing sites with equipment failure rates above the annual average and list common failure types." This dynamic prompt is first processed by the prompt engine 204, which structures it into a formal query format. It then passes the prompt through the query generation system interface 212, which acts as a conduit to the query generation system 120. The query generation system interface 212 ensures that the prompt is correctly formatted, preserving all specified parameters and structure before transmission. Upon receiving the prompt, the query generation system 120 processes it to generate an SQL query that can be executed against the enterprise's database systems. The query results, detailing sites with above-average failure rates and the types of equipment failures, are then sent back through the query generation system interface 212. This interface checks the data format and integrity before passing it back to prompt engine 204, which then formats the results into an easily understandable report for the operational manager. The operational manager receives a report that lists the sites with the highest equipment failure rates but also highlights common failure types, enabling proactive measures and targeted maintenance efforts.

In accordance with an example use, the prompt engine 204 might receive a user request for financial reporting data. The prompt engine 204 would then generate a prompt that outlines the necessary SQL query structure, dynamically incorporates the specific financial metrics requested by the user, and sends this prompt to the query generation system 120 via the query generation system interface 212. Once processed, the query results can be sent back through the system, allowing the user to receive accurate and relevant financial data.

In accordance with various embodiments, a role or persona can refer to a specific user profile or job function that critically informs the structure of the prompts generated by the system. For instance, a Database Administrator (DBA), known for their high technical proficiency in SQL and database management, would receive prompts related to database optimization, data integrity checks, or backup procedures, such as prompts structured to automate the process of indexing or to detect anomalies in database access patterns. Similarly, a Marketing Analyst, who focuses on data-driven decision-making and is proficient in data analytics tools, would see prompts aimed at extracting customer engagement metrics, sales performance by region, or the effectiveness of marketing campaigns, potentially requesting data visualizations or statistical summaries to support marketing strategy development. Sales Managers, interested in sales data and team performance, would receive prompts for retrieving sales figures, comparing projected versus actual sales, or assessing sales staff performance, possibly including forecasts of future sales trends based on historical data. Human Resources (HR) Specialists, concerned with employee data and compliance with labor laws, would use prompts to manage employee records, analyze turnover rates, or track employee satisfaction and performance reviews. Supply Chain Coordinators, managing logistics and supplier relationships, would find prompts helpful for monitoring inventory status, optimizing supply chain logistics, or assessing supplier performance metrics. Healthcare Administrators, who manage patient data and ensure regulatory compliance, would utilize prompts to access patient treatment records, analyze healthcare outcomes, or manage hospital resource allocation. IT Security Analysts, focusing on cybersecurity, would engage with prompts designed to analyze security logs, detect potential breaches, or evaluate compliance with data protection regulations.

Abstraction language interface 213 is operable to translate a natural language input into a generic, structured format that standardizes various user intents into a unified representation. Generally, abstraction language interface 213 abstracts specifics that might vary from one instance of a query to another but retains the semantic elements. This standardization process facilitates the transformation of colloquial user commands into a format that is amenable to systematic query processing.

In a specific embodiment, abstraction language interface 213 executes a parsing operation on a natural language question to extract and identify key components such as the intent, subjects, and predicates. The intent typically represents the operation the user intends to perform, such as data retrieval, update, or deletion. The subject typically represents the data or entities involved in the query. Predicates involve conditions or filters applicable to the query. For instance, converting a natural language question like "How much revenue did we generate last quarter?" into a standardized form identifies "revenue" as the subject, "generate" as the operation, and "last quarter" as the time condition.

In an embodiment, abstraction language interface 213 obtains a natural language query from a user, which could be a simple question or a complex instruction pertaining to data retrieval or manipulation. Abstraction language interface 213 parses the natural language query to dissect it into fundamental linguistic elements such as verbs (actions), nouns (subjects), and various modifiers that refine these actions and subjects. For example, the system employs natural language processing algorithms to contextually analyze verbs within the query to categorize the user's intent. For instance, the verb "show" typically suggests a retrieval action, and the interface maps this verb to a database operation such as SELECT. Utilizing semantic recognition techniques, abstraction language interface 213 determines the main data subjects by linking nouns and noun phrases to corresponding entities in the database schema, such as mapping "sales" to a "Sales" database table. The interface isolates and refines query predicates using syntactic parsing to extract and standardize conditions or constraints. For "last quarter," the system might calculate the exact date range this phrase refers to and apply it as a filter in the database query. In this stage, abstraction language interface 213 performs a semantic analysis to ensure the contextual and relational dynamics among the identified query components are correctly interpreted, preserving the intended meaning of the query within its newly standardized format.

The parsed and semantically analyzed components are then normalized into a standardized expression. This expression remains independent of specific database query languages yet structured in a logical format that databases can readily process.

The output from abstraction language interface 213 is a standardized query representation that encapsulates the core semantic elements of the original user query in a database-agnostic format. This structured output is now ready for further processing, such as being matched against predefined query patterns or transformed into an executable database command.

Expression language interface 218 is configured to translate abstracted query representations into a structured expression language consistent with the underlying data model scheme of the databases. Generally, expression language interface 218 acts as an intermediary by transforming user intents, captured in abstracted query formats, into a database-agnostic yet model-aligned structured query format. This process involves parsing of abstracted representations to ensure alignment with database entities and relationships as defined in the data model, thereby preparing the transformed expressions for efficient database querying while remaining independent of any specific database syntax. An example of such a transformation could be the conversion of abstract intents into logical database operations that integrate with existing data schemas.

In various embodiments, expression language interface 218 processes abstracted queries that encapsulate user's intent without the constraints of database-specific syntax. Expression language interface 218 converts these queries into standardized expressions that serve not as final query commands but as adaptable representations across different querying languages such as SQL or NoSQL. This transformation preserves the semantic integrity of the original user query while optimizing it for interaction with the data model. For instance, the interface might parse and reformat key elements from an abstracted query, such as "retrieve sales from last quarter," into structured expressions that mirror the logical and relational architecture of the underlying database model.

For example, the user query "retrieve sales from last quarter" is processed by expression language interface 218 to map "sales" to the corresponding database entities and "last quarter" to its appropriate time frame within the data model. This mapping is executed by analyzing the semantic structure of the abstracted query against the database schema, identifying relevant entities, and converting temporal expressions into specific date ranges that align with the system's calendar logic. The resultant structured format forms a template for generating executable queries, rather than direct database commands.

Upon generating this structured expression, the interface interfaces with data recipe engine 220, which manages predefined query templates optimized for various types of queries, such as those requiring complex joins or those benefiting from specific indexing strategies. Expression language interface 218 identifies and selects the most efficient data recipes that correspond with the standardized expressions based on a compatibility analysis, considering factors like data retrieval patterns and query complexity.

In an embodiment, this integration allows for the dynamic adjustment of query structures based on real-time data or updates to the system, such as schema modifications or introductions of new entities, with no manual updates required for the standardized expressions. For example, automatic adjustments to data recipes might occur when a new sales category is added to the database, ensuring that queries involving sales data automatically include this new category without manual intervention.

Once the appropriate data recipes are identified and assembled, they are transferred to query generation system interface 212, responsible for generating the executable code. This code directly interacts with the database systems to execute the user's intent, now translated and optimized in accordance with the architectural specifics of the system and the specific database environment.

To further elucidate, the distinction between the abstracted query and the expression query lies in their respective roles within the query processing pipeline. While the abstracted query represents a distilled version of the user's natural language input, capturing intent and semantic elements in a database-independent format, the expression query, derived from the abstracted query, is a more structured and technically detailed representation. This representation closely aligns with the data model and is prepared to be matched against predefined data recipes for efficient query execution, ensuring that user queries are not only accurately interpreted but also efficiently executed, leveraging the system's full querying capabilities.

Data recipe engine 220 is configured to optimize query generation through the use of predefined query templates, also referred to as "data recipes." Data recipe engine 220 provides a library of templates that are tailored to common types of data requests encountered within an enterprise system, thereby facilitating efficient query generation.

Predefined query patterns within data recipe engine 220 are developed for efficient performance, created by database designers or derived through machine learning algorithms, in various embodiments. In an embodiment, data recipe engine 220 utilizes machine learning algorithms to generate and refine predefined query patterns. These algorithms analyze historical query data and system performance metrics to identify patterns and efficiencies that can inform the creation of optimized query templates. For instance, machine learning models might analyze the frequency and types of queries executed against a particular dataset, identifying commonalities and bottlenecks in data access patterns. Based on this analysis, the models can generate query patterns that pre-optimize certain aspects such as join operations, data aggregation, and indexing strategies. These generated patterns are then tested and iterated upon, with the system continuously learning and updating the recipes to enhance query execution efficiency based on observed performance improvements. This approach allows data recipe engine 220 to maintain a library of query templates that are not only based on theoretical best practices but are also continually optimized through empirical data and machine learning insights.

In an embodiment, the predefined query patterns can map the standardized expressions to specific executable queries that can run directly on the database. They can be tailored to optimize the execution based on known database schema, indexing strategies, or typical workload patterns. Continuing from the above example, a predefined query pattern might recognize that querying 'sales' data for a 'last quarter' timeframe frequently involves heavy computation or accessing certain tables. The pattern could be optimized to pull this data using an indexed view that pre-aggregates sales data by quarter, thus speeding up query execution.

Data recipe engine 220 operates by applying rules to identify the most suitable pre-built data recipe for incoming query requests, which are abstracted queries transformed by the expression language interface 218. The process involves multiple lookup functions to determine which pre-built data recipes correspond with the translated expression language, ensuring that the selection optimizes system performance. For instance, when a user's abstracted query such as "analyze sales trends over the last year" is processed, data recipe engine 220 selects a recipe that configures the query to aggregate sales data by month and product category. This recipe is selected based on its efficiency in querying large datasets and its compatibility with the database's data model.

Data recipe engine 220 dynamically adjusts selected recipes based on real-time analytics of system performance and external factors such as database load and network latency. This functionality allows for the automatic adjustment of data recipes in response to detected performance bottlenecks or peak operational demands. For example, consider a scenario where comprehensive end-of-day sales reports are required across multiple retail stores. If simultaneous execution of these queries strains system resources, data recipe engine 220 modifies the query recipe to break down comprehensive queries into smaller, sequential tasks that are scheduled during off-peak hours to optimize database performance and ensure timely report generation.

In an embodiment, data recipe engine 220 incorporates predictive analytics to manage query loads proactively during anticipated high-demand periods, such as holiday sales seasons. By scheduling intensive query operations during less busy hours and enhancing data caching strategies, the engine avoids potential system slowdowns and ensures continuous operational efficiency.

In some embodiments, data recipe engine 220 is configured to interact with other components such as expression language interface 218, which provides structured expressions necessary for query processing, data recipe engine 220 ensures that the queries generated are syntactically precise and optimized for execution within the specific configurations of the enterprise's database systems.

In an example use, a supply chain manager requiring real-time inventory levels across multiple warehouses would benefit from data recipe engine 220 selecting an optimized data recipe for querying inventory databases. This recipe structures the query to efficiently integrate inventory data with incoming shipment records, enabling accurate stock level forecasting and informed decision-making regarding reorder points and logistics.

Query generation system interface 212 is operable to facilitate the assembly and execution of executable code generated from predefined data recipes, which are matched with structured expression languages. Generally, query generation system interface 212 serves as the conduit between the expression language interface 218 and the client-side agent, ensuring that the data recipes are correctly assembled into executable code. More specifically, query generation system interface 212 transforms the structured expressions into executable database commands that facilitate data retrieval, formatted as structured views to provide unified access to dispersed data across multiple data stores.

In one embodiment, query generation system interface 212 receives standardized expressions from expression language interface 218, which have been aligned with the underlying data model scheme. These expressions are processed using a series of algorithmic steps that map the abstracted queries to specific data recipes optimized for efficient data retrieval. In an embodiment, this process can involve the execution of multiple lookup functions that identify the optimal data recipe based on the query's complexity, expected data retrieval patterns, and system performance metrics. For instance, an algorithm may analyze query complexity based on the number of joins required, the size of the datasets involved, and the computational intensity of the operations specified in the query. The system then references a performance metric database to determine which data recipe minimizes execution time or system resource utilization based on historical data.

For example, a standardized expression to "retrieve sales data from the last quarter" is input into query generation system interface 212. Query generation system interface 212 interacts with data recipe engine 220 or other appropriate component to select a data recipe that efficiently aggregates quarterly sales data. The chosen recipe is then used to generate SQL or NoSQL commands, depending on the database architecture. This query generation process incorporates adjustments for database load balancing and index utilization to enhance performance.

In an embodiment, query generation system interface 212 can employ large language models (LLMs) or other trained models to process and convert the structured expressions into executable code, such as SQL commands, that directly access the source databases to retrieve the requested data. These LLMs process the structured expressions to construct commands that are both syntactically precise and semantically aligned with the user's objectives, optimizing for specified performance metrics such as query speed or data throughput.

Other techniques used by query generation system interface 212 to generate executable code include deterministic algorithms that apply rules-based transformations to structured expressions. These transformations are designed to efficiently map data requests to database schema elements, utilizing pre-defined syntactic templates that align with the data model and query performance optimization strategies.

In another embodiment, query generation system interface 212 dynamically adapts the query execution strategy based on real-time analytics of system performance and external factors such as network latency or database load. This ensures that queries are executed efficiently, even under varying system conditions. For instance, during peak load times, the interface may alter query execution plans to distribute database load or delay non-critical queries to maintain system responsiveness.

In an embodiment, query generation system interface 212 integrates predictive analytics to pre-emptively adjust queries based on anticipated database demands. For example, during expected high-demand periods like sales events or financial closings, query generation system interface 212 schedules data-intensive query operations during off-peak hours and enhances data caching strategies to expedite query processing.

In accordance with an example use, consider a scenario where a supply chain manager requests a real-time inventory overview. Query generation system interface 212 receives the query, processes it through the described mechanisms, and generates an SQL command that efficiently queries inventory levels across multiple warehouses. The results are then structured into a comprehensive view that provides the manager with actionable insights into inventory statuses, enabling timely decision-making on stock management and reorder processes.

Output engine 214 is operable to format and deliver query results generated by the query generation system 120 to the user or to another system component for further processing. Generally, output engine 214 ensures that the data retrieved from the data stores is presented in a structured and accessible manner, tailored to the specific needs of the user or application. More specifically, output engine 214 converts raw query results into various formats suitable for different interfaces, such as dashboards, reports, or machine-readable data streams.

In one embodiment, output engine 214 receives query results from the query generation system 120, which have been processed and optimized for data retrieval. The results, typically in a structured format such as SQL result sets, are then transformed by output engine 214 into the desired output format. This transformation can include formatting the data into JSON, XML, or CSV formats for integration with other systems or visualizations.

For example, consider a scenario where a financial analyst requests a report on quarterly sales. The query generation system 120 retrieves the relevant sales data, and output engine 214 formats this data into a comprehensive report. The report may include tables, graphs, and summary statistics, which are then delivered to the analyst via a web dashboard or as a downloadable file.

Similarly, in another example, a supply chain manager might need real-time inventory data. After the query generation system 120 retrieves the necessary inventory levels, output engine 214 formats this data into an interactive dashboard, allowing the manager to monitor stock levels across multiple warehouses dynamically. The dashboard could include real-time updates, alerts for low stock levels, and predictive analytics to forecast future inventory needs.

In an embodiment, output engine prepares queries to be returned to an enterprise system or a device in communication with an enterprise system. In this scenario, output engine 214 takes the response received from the query generation system 120 and prepares it into a query format that can be used to retrieve data from a data store associated with the enterprise system. This ensures that the query results are not only accurate but also actionable within the context of the enterprise's data infrastructure.

Further, in some embodiments, output engine 214 incorporates dynamic elements to adapt the output based on user preferences or system requirements. For instance, if a user prefers data in a specific format or needs certain visual elements, output engine 214 can customize the output accordingly. This dynamic customization enhances the usability and relevance of the query results, ensuring that they meet the specific needs of different users within the enterprise.

In various embodiments, output engine 214 interacts with other components of the query wise stateless structure engine 110 to ensure integration and consistent data flow. For example, output engine 214 may receive real-time updates from quality assurance module 316 to include in the final output, ensuring that the data presented is both current and accurate.

In one embodiment, output engine 214 also supports the generation of machine-readable outputs for integration with automated systems. For example, query results can be formatted into JSON or XML and sent to an API endpoint, allowing other applications to consume and process the data automatically. This functionality is particularly useful for integrating with enterprise resource planning (ERP) systems, customer relationship management (CRM) systems, and other enterprise applications.

In accordance with an example use, consider a scenario where output engine 214 prepares a response for a logistics application. A logistics manager requests data on delivery times across various routes. The query generation system 120 retrieves the relevant data, and output engine 214 formats it into an XML file. This file is then sent to the logistics application via an API, enabling the application to update delivery schedules and optimize route planning based on the latest data.

Similarly, output engine 214 can prepare outputs for reporting and compliance purposes. For instance, a compliance officer may request a detailed audit trail of financial transactions for regulatory reporting. Output engine 214 receives the query results from query generation system 120 and formats them into a CSV file, which is then used to generate the necessary compliance reports.

In another example, output engine 214 formats query results for a customer-facing application. A customer service representative may need access to a customer's order history. The query generation system 120 retrieves the order data, and output engine 214 formats it into a user-friendly report that the representative can view on their dashboard. This report includes order details, shipment status, and any customer interactions, providing a comprehensive view of the customer's history.

In this manner, output engine 214 ensures that the results generated by query generation system 120 are effectively transformed and delivered in a format that is both usable and relevant to the end-user or application, facilitating efficient data utilization and decision-making within the enterprise.

Figure 3:
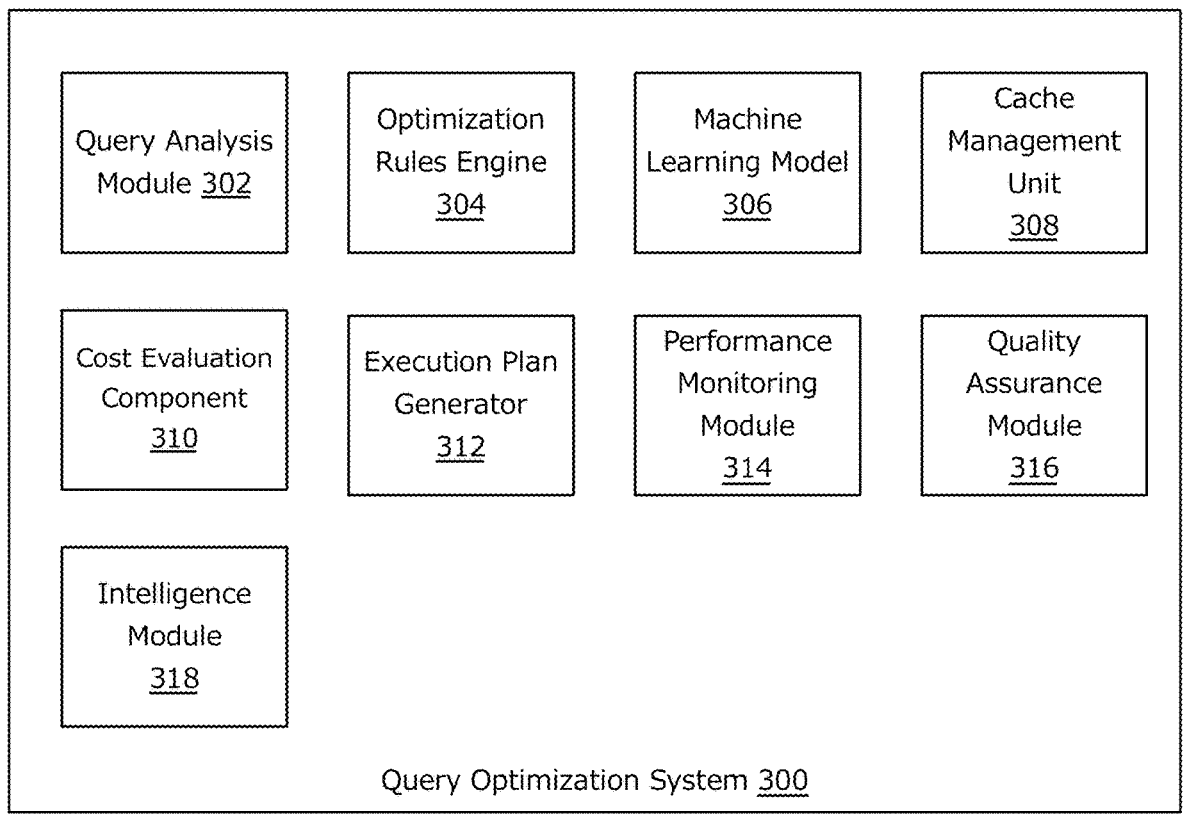
FIG. 3 illustrates an example computing environment including a query optimization system in accordance with an exemplary embodiment.

FIG. 3 illustrates an example computing environment in accordance with an exemplary embodiment of the present invention. The computing environment may comprise a query optimization system 300, such as the query optimization system 124 in FIG. 1B. The computing environment may comprise one or more servers. The computing environment may comprise a cloud computing environment. The query optimization system 300 may comprise a query analysis module 302, an optimization rules engine 304, a machine learning model 306, a cache management unit 308, a cost evaluation component 310, an execution plan generator 312, a performance monitoring module 314, a quality assurance module 316, and an intelligence module 318.

Query analysis module 302 is operable to assess and refine incoming executable queries generated by the query generation system interface 212. Generally, the query analysis module 302 functions as the initial processing point for these executable queries, where it conducts an analysis to determine optimal strategies for their execution based on complexity, available resources, and predefined performance metrics. More specifically, the query analysis module 302 operates by segmenting each executable query to identify its fundamental components, such as the selectivity of conditions, the estimated size of the result set, and the computational resources required for processing. In one embodiment, the module might analyze a complex join operation within an executable query to decide whether rewriting the query or reordering the join operations could reduce execution time.

For example, when an executable query involving multiple data sources with varying loads is received from the query generation system interface 212, the query analysis module 302 assesses the current load on each data source and the network conditions to propose an execution path that minimizes data transfer and processing time. This might include comparing the current load against a threshold and determining an execution path based on this comparison. Similarly, another example includes the module identifying an executable query that frequently scans a large table and recommending the creation of an index on a column frequently used in the query's filter condition, thus significantly reducing the query execution time.

In various embodiments, query analysis module 302 incorporates machine learning algorithms that learn from historical query performance data to predict the most efficient execution strategies for similar queries. For instance, the module could use data from past query executions to train a model that predicts the cost of query operations under different system load conditions.

In some embodiments, the query analysis module 302 is integrated with a real-time monitoring system that provides continuous feedback on query performance. This integration allows the module to adjust its analysis algorithms based on real-time data, enhancing its ability to respond to changing conditions dynamically.

In accordance with an example use, consider a scenario where an e-commerce company needs to generate a report on customer purchases during a major sale event. The query analysis module 302 receives the executable query from the query generation system interface 212 and recognizes that the query would traditionally result in a full table scan of the purchases table. To optimize this, the module suggests breaking down the query into smaller, indexed queries based on product categories, which are then executed in parallel, reducing the overall load and response time.

Optimization rules engine 304 is operable to apply a set of predefined and dynamic rules to enhance the efficiency and effectiveness of query execution. Generally, the optimization rules engine 304 functions as a decision-making hub that applies various techniques to transform queries from an input to an optimized form based on the system's current state and operational guidelines. In an embodiment, techniques employed can include, for example, query factorization, predicate pushdown, and the use of execution plan heuristics. More specifically, optimization rules engine 304 operates by employing a set of algorithms that analyze incoming queries and apply optimizations such as rewriting queries, reordering join operations, or simplifying expressions. In one embodiment, the engine might convert suboptimal SQL commands into more performance-efficient forms by rearranging their structure or substituting resource-intensive operations with lighter equivalents.

For example, when a query involves multiple joins that can be executed in various sequences, the optimization rules engine 304 evaluates the cost associated with each potential sequence and reorders the joins to minimize the data shuffle across the network. Similarly, another example includes the engine identifying opportunities to use indexed views or materialized views to replace complex aggregations in queries, thereby reducing the time taken for execution significantly.

In various embodiments, optimization rules engine 304 dynamically adapts based on real-time performance metrics and system feedback. Performance metrics monitored include query execution time, memory usage, and CPU load. For instance, if certain query optimizations consistently result in performance degradation during peak load times, the engine adjusts its rule set to either defer such optimizations to off-peak hours or replace them with less resource-intensive alternatives. For example, if a join operation typically causes a spike in memory usage during business hours, the engine may schedule this operation to run overnight or utilize a more memory-efficient join algorithm.

In some embodiments, the optimization rules engine 304 integrates with the performance monitoring module 314, which provides continuous feedback on the effectiveness of applied optimizations. This feedback loop allows the engine to refine its rules continuously and adapt to evolving data patterns and query characteristics. For instance, if feedback indicates that certain index usages are leading to slower query responses, the engine may alter its rules to prioritize different indices or adjust index maintenance schedules. Specifically, the system might monitor the query response times and compare them against a predefined threshold. If the response time for queries utilizing a particular index consistently exceeds this threshold, indicating suboptimal performance, the optimization rules engine 304 triggers a rule modification protocol. This protocol could involve deprioritizing the inefficient index in favor of more efficient ones available in the database schema or adjusting the index maintenance schedule to enhance its performance, such as increasing the frequency of index rebuilds or updates to maintain optimum efficiency.

In accordance with an example use, consider a scenario where a financial analytics firm regularly runs complex aggregation queries to compile end-of-day reports. An example of such a query could be, "SELECT Region, SUM (Sales) FROM Transactions WHERE Date BETWEEN '2022 Jan. 1' AND '2022 Jan. 31' GROUP BY Region ORDER BY SUM (Sales) DESC." The optimization rules engine 304 receives these queries and applies a rule that detects and replaces certain on-the-fly calculations with pre-computed summary tables. For instance, instead of calculating revenue totals directly from transaction records each time, which involves a significant computational overhead due to the large volume of data, the engine could direct the use of a daily updated summary table that tracks revenue by region. This pre-computed table is updated every night with the day's sales data, thus significantly reducing the computational load during peak report generation periods by allowing the query to retrieve pre-aggregated data, ensuring faster access and reporting.

Machine learning model 306 utilizes predictive analytics to enhance query processing and optimization. It learns from historical query data to forecast and recommend optimal execution strategies, thereby reducing processing time and improving system-wide resource allocation. More specifically, machine learning model 306 analyzes patterns in query execution such as execution times, resource usage, and outcome effectiveness. For instance, using regression algorithms or neural networks, the model predicts the impact of various query optimizations. A technical example includes the model employing time series forecasting to predict peak query times during business hours, enabling proactive data pre-loading into cache to optimize performance.

In one embodiment, machine learning model 306 employs decision tree algorithms to classify queries based on characteristics influencing their performance, such as query complexity, data size, and current system load. For example, it might identify a complex query involving large datasets scheduled during peak periods and suggest rescheduling to nighttime or simplifying the query by segmenting it into smaller, more manageable parts. This allows for more efficient processing by distributing the load more evenly over time or across system resources.

Machine learning model 306 dynamically updates its predictions based on real-time feedback and performance metrics such as CPU usage and response times. This real-time feedback is obtained through system monitors that track and report query performance metrics upon query execution. If these metrics exceed predefined thresholds—such as CPU usage exceeding 80% of capacity—the model triggers adaptive adjustments in the query execution strategy. This dynamic learning process continually refines the model's predictive accuracy, allowing it to adapt to evolving data patterns. For example, if the model consistently observes poor performance from queries involving certain data types or operations, it recalibrates the prediction parameters to adjust the thresholds for resource usage and optimizes future query executions accordingly.

The integration of machine learning model 306 with other system components, such as the performance monitoring module 314 and the optimization rules engine 304, can establish a feedback loop. For example, post-optimization, performance data such as the number of disk reads or temporary space usage is automatically fed back into the model. The model analyzes whether the applied optimizations result in the expected improvements. If not, it adjusts its strategy recommendations based on quantitative analysis, learning to better correlate specific optimization tactics with actual performance outcomes.

Consider a scenario where an online retail platform experiences variable query loads based on seasonal shopping trends. Machine learning model 306 analyzes historical query performance during similar periods and identifies trends in query volume peaks. Using this data, it forecasts upcoming high-load periods and proactively suggests optimizations such as query caching or load distribution strategies to maintain optimal performance. For instance, in anticipation of a known sales event, the model might recommend activating additional database replicas to handle expected query spikes or adjusting server resource allocation to ensure smooth system performance, thereby preventing system overloads and maintaining user experience.

Cache management unit 308 is operable to determine which data or queries should be cached based on their access frequency and the resource consumption involved in retrieving them from the primary data store. For instance, it might use a Least Recently Used (LRU) algorithm to prioritize the caching of data that is most frequently accessed, while less frequently accessed data is removed from the cache to make room for new entries. Further, cache management unit 308 is capable of dynamically adjusting its caching strategies based on real-time system performance metrics. In an embodiment, caching policies can be aligned with current system requirements, optimizing memory utilization and data retrieval times. For example, during peak business hours, the unit may increase its cache size to accommodate a higher number of queries, and conversely, reduce the cache size during off-peak hours to conserve resources.

In various embodiments, cache management unit 308 interacts with other components of the query optimization system 124, such as the machine learning model 306 and the performance monitoring module 314. This interaction enables cache management unit 308 to receive insights on query performance and system load, enabling more informed decisions about cache management. For instance, if the performance monitoring module detects a slowdown in query processing, the cache management unit might clear less critical data from the cache to free up resources for more urgent queries.

In accordance with an example use, consider a scenario where a large e-commerce platform experiences significant fluctuations in user traffic. Cache management unit 308 analyzes traffic and query patterns and identifies the most commonly accessed product categories during specific times. It proactively caches data related to these categories, ensuring that user queries related to popular items are served quickly and efficiently, thereby enhancing user experience and system responsiveness.

Cost evaluation component 310 is operable to assess the resource utilization and cost-effectiveness of query execution plans. Generally, this component functions to ensure that queries are processed in the most resource-efficient manner, balancing system load and minimizing operational costs. More specifically, cost evaluation component 310 analyzes each query's potential impact on system resources, such as CPU usage, memory, disk I/O, and network latency. It calculates the estimated cost of executing each query based on these parameters. For example, the component might evaluate a complex join operation to determine if the resource cost outweighs the benefit of executing the join in its current form and may suggest alternative execution plans that consume fewer resources.

In one embodiment, cost evaluation component 310 employs a cost-based optimizer that uses statistical data about the database's state and past query performance to model different execution strategies. This optimizer can dynamically adjust query plans in response to changing data volumes and query frequencies. For instance, it might recommend materializing a frequently accessed complex query result as a temporary view to reduce the cost of repeated executions.

In certain embodiments, cost evaluation component 310 integrates with the machine learning model 306 to refine its cost predictions over time. By incorporating machine learning predictions, the component can preemptively adjust query strategies based on anticipated changes in data use patterns and system load. For example, during anticipated high-load periods, the component might prioritize less resource-intensive queries or adjust query execution times to off-peak hours.

In various embodiments, cost evaluation component 310 interacts with other system components such as the cache management unit 308 and the performance monitoring module 314 to ensure that the cost evaluation strategies are informed by the most current system performance data and caching policies. For example, if the cache management unit 308 indicates that certain data is now cached, cost evaluation component 310 recalculates the cost of related queries to reflect the reduced resource usage due to caching. In accordance with an example use, consider a scenario in a data-intensive application where multiple analytics queries are submitted simultaneously. Cost evaluation component 310 assesses each query to determine its impact on system performance and suggests execution modifications to prevent system overloads. For instance, it might stagger the execution of resource-heavy queries or propose modifications such as query splitting or simplification to enhance overall system efficiency.

Execution plan generator 312 is operable to generate execution strategies for database queries. Generally, this component synthesizes the analyses from other components, such as the cost evaluation component 310 and the optimization rules engine 304, to generate optimized query execution plans. More specifically, execution plan generator 312 utilizes algorithms to construct execution paths that minimize resource usage while maximizing query performance. It considers various factors, such as data locality, resource availability, and predicted query load, to devise the most effective execution strategy. For example, it might determine that executing a query directly on a data node where the data resides reduces data transfer costs and improves response times.

In one embodiment, execution plan generator 312 employs a heuristic-based approach to develop these plans, incorporating rules that account for the specific characteristics of the database system, such as index availability and the historical performance of similar query types. For instance, if a query frequently accesses a particular table with a high read cost, the execution plan might include pre-fetching data into cache before query execution to speed up the process. In an embodiment, execution plan generator 312 dynamically adjusts execution plans in real-time based on current system performance and external factors. For example, during periods of high demand, the generator might prioritize simpler, less resource-intensive queries, or adjust query plans to distribute load more evenly across the system.

In various embodiments, execution plan generator 312 interacts with the machine learning model 306, which provides predictive insights into query behavior based on historical data. This interaction enables the execution plan generator to anticipate future system states and adjust plans proactively. For instance, if the model predicts a spike in load, the execution plan generator might pre-emptively modify plans to incorporate more aggressive caching strategies or query simplification techniques.

In accordance with an example use, consider a data-intensive application where analytical queries are submitted in real-time. Execution plan generator 312 assesses each query to determine the optimal path of execution based on current system metrics. If a query is predicted to be particularly resource-heavy, the generator might split the query into smaller sub-queries that can be processed in parallel, significantly reducing the overall execution time and enhancing system throughput.

Performance monitoring module 314 is operable to monitor and report on the performance metrics of query executions. Generally, this module maintains system efficiency and identifies areas for potential improvement in query processing. More specifically, performance monitoring module 314 continuously tracks various system parameters such as query execution times, resource utilization (CPU, memory, disk I/O), and error rates. This data is vital for assessing the effectiveness of executed queries and the overall health of the system. For example, the module might detect an unusually long execution time for a normally efficient query, triggering a deeper analysis to uncover potential issues like resource contention or database locks.

In one embodiment, performance monitoring module 314 employs real-time analytics to provide feedback to other components of the system, such as the optimization rules engine 304 and the execution plan generator 312. This allows for dynamic adjustments to be made to optimize query processing strategies continually. For instance, if an increase in error rates is observed after a new execution plan is deployed, the module can signal for a rollback or adjustment to that plan. Further, performance monitoring module 314 facilitates historical performance analysis, which assists in long-term system tuning and capacity planning. By aggregating and analyzing data over time, the module can identify trends and patterns that may not be apparent from real-time data alone. For example, a gradual increase in query load over several months might prompt recommendations for hardware upgrades or changes in system architecture.

In various embodiments, performance monitoring module 314 integrates with the machine learning model 306 to enhance predictive capabilities. This integration enables the module to not only report on current system states but also predict future system behavior based on historical data. For instance, using predictive analytics, the module might forecast periods of high load and advise preemptive actions to mitigate potential performance bottlenecks.

In accordance with an example use, consider a scenario in a large e-commerce platform where timely data retrieval is crucial during high traffic events like sales or promotions. Performance monitoring module 314 tracks query performances during these events and identifies any bottlenecks in real-time. Based on this data, the system can dynamically adjust query execution plans, such as by reallocating resources or prioritizing critical queries, to ensure optimal performance and maintain a seamless user experience.

Quality assurance module 316 is operable to ensure the integrity and correctness of data throughout the query optimization and execution processes. Generally, quality assurance module 316 operates to validate data, detect errors, automate tests, generate reports, and facilitate a feedback loop with user interactions. More specifically, the module can incorporate a data validation engine or other such component operable to check the accuracy and format of incoming data against established data schemas, ensuring data entering the system meets quality standards before processing. In this example, the data validation engine could automatically reject any query inputs that do not comply with predefined data types or that violate database constraints, thereby preventing potential execution errors or data corruption. In a specific example, this engine might automatically compare query results against a repository of known data patterns to identify anomalies or discrepancies that could indicate processing errors or misinterpretation of the user's original query intent.

In an embodiment, an error detection module or other appropriate module within the quality assurance module 316 employs machine learning algorithms to learn from historical query data, continuously refining its validation processes to prevent errors and improve output quality over time. [provide a technical detailed example] This could involve simulating the impact of a query on a virtual model of the database to ensure operations do not result in unintended modifications or data corruption.

In one embodiment, a test automation unit or other appropriate component of quality assurance module 316 executes predefined test cases on queries before they are fully executed. This unit helps in catching errors in the early stages of query processing, thereby reducing the need for more resource-intensive corrections later in the workflow.

In certain embodiments, the quality assurance module 316 includes a report generator which compiles detailed reports on query handling and result accuracy. These reports assist in maintaining audit trails and compliance with data governance standards, tracing the lifecycle of a query from its inception as a user request through to the final output delivery.

In an embodiment, a feedback loop within quality assurance module 316 operates through a series of automated steps that enhance system adaptability by dynamically refining data validation rules based on error analysis. Specifically, errors related to date format mismatches are automatically logged by the error detection module each time they occur. In an embodiment, a "frequent error" can be determined based on a threshold, such as an error occurring more than fifty times within a 24-hour period. Severity can be determined by the impact of the error on system performance or data integrity, with thresholds set for minor, major, and critical impacts, for example.

In an embodiment, machine learning algorithms analyze these logs through a series of steps, beginning with data aggregation where errors are grouped by type and timestamp. Then, pattern recognition algorithms identify trends, such as increased errors during specific hours, which may indicate system load impacts. If the error rate for any category exceeds a predefined threshold-set, for instance, at a 5% error rate per query type—the system automatically initiates a protocol within the data validation engine to revise the validation rules. In an example, this might involve updating criteria for date formats by specifying that all date inputs must conform to the ISO 8601 standard ("YYYY-MM-DD"). Such adjustments can be tested in a controlled environment to ensure they do not adversely affect other system functionalities. If successful, the new validation rules can be propagated throughout the system, and all subsequent queries are checked against these updated rules. This feedback loop also includes continuous monitoring of the outcomes of these rule changes. If the revised rules reduce the error rate below the threshold, they are maintained; otherwise, the system iteratively adjusts the rules, further refining the process.

In various embodiments, a user interface can be provided to enable system administrators to manually review and intervene in the query validation process if necessary. This interface provides a user-friendly platform for monitoring and adjusting the validation rules and criteria as per changing requirements and scenarios.

In accordance with an example use, consider a scenario where an online retail platform experiences high query loads during holiday sales events. After a user submits a natural language query, such as "Show me last year's sales on Black Friday," which is processed through the system, the quality assurance module 316 evaluates the resulting SQL or API call. It checks for common errors like incorrect date formats or unauthorized data access attempts. If the query passes these checks, the module allows the query results to be sent back through the network 104. However, if an error is detected, such as a date format mismatch (e.g., "Black Friday" not recognized as a date), the module triggers an alert to the system administrator through the user interface, suggesting a correction to "2023 Nov. 24" for processing.

Intelligence module 318 is operable to generate intelligent insights from the data retrieved through the query optimization system 300. Generally, intelligence module 318 functions as a post-processing component that analyzes and visualizes the data to support strategic decision-making within the enterprise. More specifically, intelligence module 318 applies various analytical techniques to the data, transforming raw query results into actionable insights.

In one embodiment, intelligence module 318 integrates with query analysis module 302 to obtain refined query results. These results are then processed through a series of analytical functions, such as trend analysis, forecasting, and pattern recognition. For example, intelligence module 318 might take sales data retrieved for the last quarter and apply trend analysis to identify patterns in customer purchasing behavior. This could involve aggregating data by product category, region, and time period to provide a comprehensive view of sales performance.

In another embodiment, intelligence module 318 leverages machine learning algorithms to enhance its analytical capabilities. For instance, the module might use predictive modeling to forecast future sales based on historical data. This process involves training a model on past sales data and using it to predict future trends, helping the enterprise to plan inventory and marketing strategies more effectively.

Further, in some embodiments, intelligence module 318 incorporates real-time data analytics to provide up-to-date insights. This capability is particularly useful for monitoring ongoing operations, such as tracking real-time inventory levels or monitoring live sales data. By integrating real-time data feeds, intelligence module 318 ensures that the insights provided are current and relevant to the immediate needs of the enterprise.

In some embodiments, intelligence module 318 is configured to interact with performance monitoring module 314 to continuously evaluate the effectiveness of the insights provided. For example, if a particular sales strategy is implemented based on the insights generated by intelligence module 318, performance monitoring module 314 can track the results and provide feedback, which intelligence module 318 can then use to refine its analytical models.

In another embodiment, intelligence module 318 includes a visualization engine that transforms analytical results into user-friendly formats, such as dashboards, charts, and graphs. This visualization engine is critical for ensuring that complex data insights are accessible and understandable to decision-makers within the enterprise. For instance, sales trends identified through data analysis can be displayed on a dashboard that highlights key performance indicators, enabling quick and informed decision-making.

Similarly, intelligence module 318 can generate detailed reports that summarize the analytical findings. These reports can be customized to meet the specific needs of different departments within the enterprise, such as finance, marketing, and operations. For example, a financial report might focus on revenue trends and cost analysis, while a marketing report might emphasize customer segmentation and campaign performance.

In various embodiments, intelligence module 318 also supports ad-hoc querying and analysis, allowing users to perform custom analyses without needing deep technical expertise. This feature enhances the flexibility of the intelligence module, enabling it to cater to a wide range of analytical needs within the enterprise.

In accordance with an example use, consider a scenario where a retail company utilizes intelligence module 318 to enhance its business strategy. The module receives sales data from the query optimization system 300 and applies predictive modeling to forecast future sales trends. The results are visualized in a dashboard that displays projected sales for the upcoming quarters, segmented by product category and region. Additionally, real-time analytics are used to monitor current sales performance, providing the company with a comprehensive view of its sales dynamics and enabling it to adjust its strategies proactively.

Figure 4:
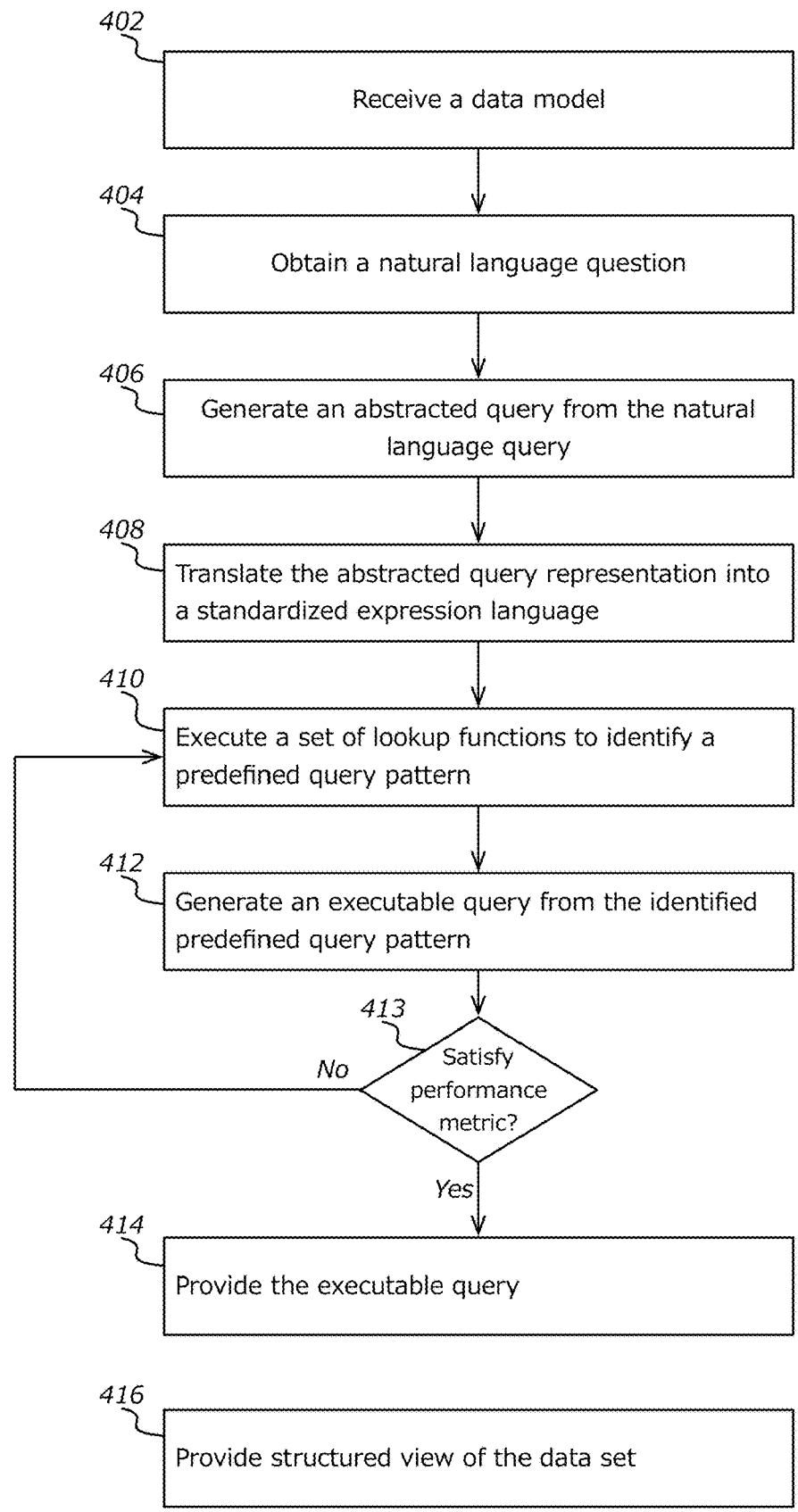
FIG. 4 illustrates an exemplary process for facilitating database queries according to one embodiment of the invention.

FIG. 4 illustrates an exemplary process for facilitating database queries according to one embodiment of the invention. In embodiments, the method steps or techniques depicted and described herein can be performed in a processor of the query wise stateless structure engine 110 in FIG. 1A, the method steps being encoded as processor-executable instructions in a non-transitory memory of the query wise stateless structure engine 110. The techniques of FIG. 4 may be implemented in an operating system kernel, in a separate user process, in a library package bound into network applications, on a specially constructed machine, on an application-specific integrated circuit (ASIC), or a field-programmable gate array (FPGA). The process may comprise additional steps, fewer steps, and/or a different order of steps without departing from the scope of the invention as would be apparent to one of ordinary skill in the art.

At step 402, a data model associated with a plurality of data stores connected via a network is received. The data model can be obtained through various means, such as: (1) extracting schema information directly from the data stores; (2) receiving an ER diagram provided by the user; or (3) generating the data model by analyzing existing data structures and relationships within the data stores. The data model may include entities, attributes, and relationships describing the data structure of the plurality of data stores, along with metadata indicating data types, constraints, and relationships between data entities stored across the plurality of data stores.

At step 404, a natural language question is obtained from a user for a data set. The data set is maintained across a plurality of data stores, which are organized in different formats and lack a unified schema, making direct querying complex. That is, the data set being maintained across the plurality of data stores and stored in a non-standardized format and not correlated. For example, the natural language could be "Show me the sales data for the last quarter," highlighting the need to aggregate data from various sources with different structures. In accordance with various embodiments, the plurality of data stores are accessible by the user but not directly accessible by the computing device that obtains the natural language question. This ensures that the user's data remains secure within their environment, with only metadata or schema information being used by the central processing system to generate the query.

In certain embodiments, the query is refined using prompts provided by a prompt engine and personas. For instance, if the user initially queries "Show me recent sales," the prompt engine might refine this to "Show me the sales data for the last quarter" based on user role and context.

At step 406, an abstracted query representation is generated from the obtained natural language question. This involves parsing the natural language question to identify key entities and intents and generating an intermediate representation based at least in part on the identified entities and intents.

At step 408, the abstracted query representation is translated into a standardized expression language based at least in part on the data model. In an embodiment, this can include mapping the identified key entities and intents to corresponding elements in the data model.

At step 410, a set of lookup functions is executed to identify a predefined query pattern for querying the plurality of data stores. The predefined query pattern corresponds to the standardized expression language and is selected based on at least one system performance metric. In an embodiment, this can include accessing a lookup table that maps components of the standardized expression language to predefined query patterns, evaluating multiple predefined query patterns against the standardized expression language based on the at least one system performance metric, and selecting the predefined query pattern that optimizes the at least one system performance metric for querying the plurality of data stores.

At step 412, an executable query is generated from the identified predefined query pattern. In an embodiment, this involves accessing a lookup table that maps components of the standardized expression language to corresponding query fragments, assembling the query fragments based on the predefined query pattern to form the executable query, and optimizing the executable query based on the at least one system performance metric across the plurality of data stores. Additionally or alternatively, a large language model (LLM) trained on a corpus of query patterns and system performance metrics may be utilized to translate the predefined query pattern into the executable query. A decision is made 413 whether the query satisfies a threshold or metric. For example, a system performance metric such as query execution time can be used to determine whether to loop back and refine the query. If the query does not satisfy the threshold or metric, steps 410 and 412 may be reiterated one or more times to refine the query and optimize the results before transmission to the user.

If the query does satisfy the threshold, at step 414, the executable query is provided in response to the natural language question. In an embodiment, the executable query is provided to a client-side agent with access to the plurality of data stores. The client-side agent executes the executable query to retrieve the data set, wherein the data set is formatted as a structured view enabling unified access to data dispersed across the plurality of data stores.

At step 416, the structured view of the data set is provided to the user. In an embodiment, the structured view may include business intelligence insights such as data visualizations, summaries, and analytics that provide actionable insights to the user.

Figure 5:
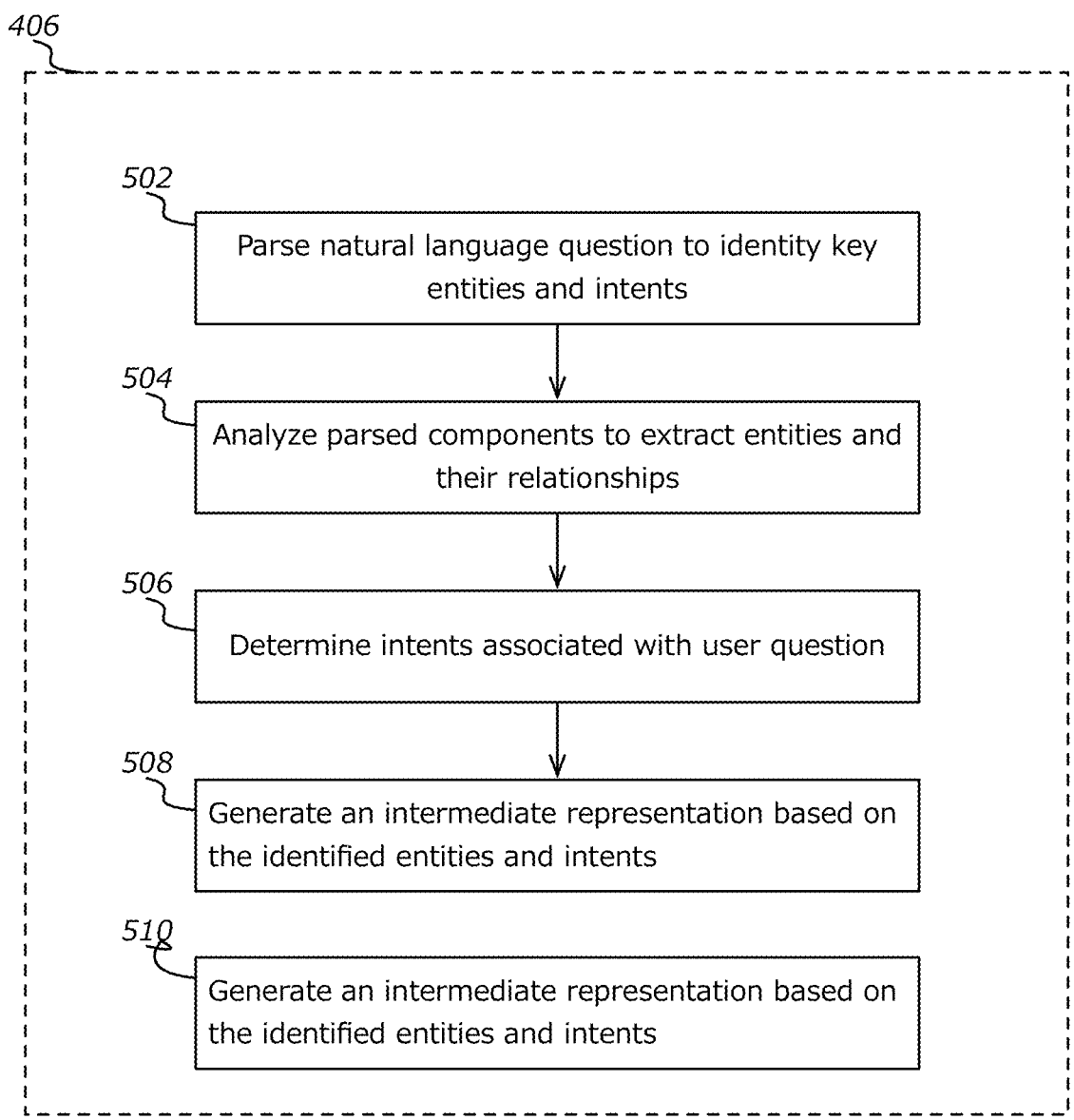
FIG. 5 illustrates an exemplary process for generating an abstracted query representation from an obtained natural language query according to one embodiment of the invention.

FIG. 5 illustrates an exemplary process for generating an abstracted query representation from an obtained natural language query according to one embodiment of the invention. This process is a detailed description of step 406 of FIG. 4. In embodiments, the method steps or techniques depicted and described herein can be performed using advanced natural language processing (NLP) algorithms and machine learning models specifically trained for query parsing and entity recognition. The query wise stateless structure engine 110 in FIG. 1A executes these steps, utilizing processor-executable instructions stored in a non-transitory memory. The NLP techniques may include tokenization, part-of-speech tagging, named entity recognition, and dependency parsing, which are implemented in a software framework such as TensorFlow, PyTorch, or spaCy. The process may comprise additional steps, fewer steps, and/or a different order of steps without departing from the scope of the invention as would be apparent to one of ordinary skill in the art.

At step 502, the natural language question obtained from a user is parsed to identify key entities and intents. In an embodiment, this can involve tokenizing the natural language question into individual components, such as keywords and phrases, to facilitate further analysis. For example, in the query "Show me the sales data for the last quarter," key entities might include "sales data" and "last quarter."

At step 504, the parsed components are analyzed to extract relevant entities and their relationships. In an embodiment, this step can involve mapping the identified keywords and phrases to corresponding elements in the data model, such as entities, attributes, and relationships. In certain embodiments, the system may utilize predefined dictionaries or ontologies to enhance the accuracy of entity recognition. For instance, "sales data" might be mapped to a specific sales entity in the data model, and "last quarter" might be associated with a specific time period attribute.

At step 506, the intents associated with the user's question are determined. In an embodiment, this can involve determining the purpose of the question, such as whether the user is requesting data retrieval, data aggregation, or data filtering. In certain embodiments the system uses natural language processing (NLP) techniques and machine learning models to infer the user's intent. For example, in the query "Show me the sales data for the last quarter," the intent might be to retrieve and aggregate sales data for a specific time period.

At step 508, an abstracted query representation (e.g., intermediate representation) is generated based on the identified entities and intents. In an embodiment, the abstracted query representation captures the essence of the user's query in a structured format, abstracting out specific parameters. The abstracted query representation serves as a bridge between the natural language question and the standardized expression language. It includes structured elements such as entity names, attribute conditions, and intended operations, specifying what data is needed and how it should be processed. For instance, the abstracted query representation for the query "Show me the sales data for the last quarter" might include elements representing the "sales" entity, the "last quarter" time period, and the operation to retrieve and aggregate data.

To generate the abstracted query representation, the system can employ various techniques and alternatives, depending on the specific requirements and constraints of the implementation. In accordance with a non-limiting embodiment, an Entity-Relationship (ER) model may be used to represent the entities, attributes, and relationships within the database schema. The identified entities and intents from the natural language query can be mapped to the corresponding elements in the ER model, and the abstracted query representation can be generated based on the mapped entities, attributes, and relationships. Alternatively, other data modeling techniques, such as object-oriented modeling or document-based modeling, can be used depending on the database type and structure.

In another embodiment, an Abstract Syntax Tree (AST) may be used to represent the structure and semantics of the natural language query. Each node in the AST corresponds to a specific component of the query, such as entities, attributes, conditions, and operations. By traversing the AST, the relevant information can be extracted, and the abstracted query representation can be generated. As an alternative, other parsing techniques, such as dependency parsing or semantic role labeling, can be used to analyze the query and extract the necessary components.

To capture the abstracted query structure, a custom intermediate representation language can be defined. This language should include constructs for representing entities, attributes, conditions, and operations, allowing the abstracted query representation to be expressed in a structured and standardized format. Existing intermediate representation languages, such as relational algebra or query plan trees, can also be utilized if they align with the system's requirements.

Query templates may be used in one embodiment for generating the abstracted query representation. By defining a set of query templates that correspond to common query patterns and structures, the identified entities and intents from the natural language query can be matched to the appropriate query template. The template can then be filled in with the specific parameters extracted from the query to generate the abstracted query representation. Machine learning techniques, such as sequence-to-sequence models or template-based generation, can also be used to automatically generate the abstracted query representation based on the input query.

Semantic parsing techniques can be employed to map the natural language query to a formal meaning representation. Semantic grammars or semantic parsing frameworks, such as Combinatory Categorial Grammar (CCG) or Semantic Parsing with Execution (SPE), can be used to parse the query and generate the abstracted query representation. Other semantic parsing approaches, such as neural semantic parsing or unsupervised semantic parsing, can be explored depending on the available training data and system requirements.

Knowledge graphs can be constructed to capture the entities, attributes, and relationships within the database schema. By mapping the identified entities and intents from the natural language query to the corresponding nodes and edges in the knowledge graph, the abstracted query representation can be generated based on the mapped entities and relationships. Other graph-based representations, such as ontologies or concept maps, can also be used to model the database schema and generate the abstracted query representation.

Domain-Specific Languages (DSLs) can be designed specifically for representing database queries in an abstracted format. The DSL should include constructs for specifying entities, attributes, conditions, and operations, allowing the natural language query to be translated into the DSL representation to generate the abstracted query representation. Existing DSLs or query languages, such as SQL or GraphQL, can also be utilized if they provide sufficient expressiveness and abstraction capabilities.

The choice of technique for generating the abstracted query representation depends on factors such as the complexity of the queries, the structure of the database schema, the available resources and expertise, and the desired level of abstraction and standardization.

At step 510, the abstracted query representation is validated against the data model to ensure consistency and accuracy. This can include, for example, checking that the entities and relationships referenced in the abstracted query representation exist in the data model and that the query logic adheres to the constraints and rules defined by the data model. If discrepancies are found, the system may prompt for clarification or automatically correct the abstracted query representation based on predefined rules.

A variety of validation techniques may be used as discussed herein, including, but not limited to: schema validation, where the schema information from the data model, including entities, attributes, relationships, and constraints, is retrieved. The abstracted query representation is parsed, and the referenced entities, attributes, and relationships are extracted. These extracted elements are then compared against the schema information to ensure they exist and are consistent with the data model. The query logic is also validated against the constraints and rules defined in the schema, such as data types, cardinality, and integrity constraints. Alternatively, schema validation libraries or tools specific to the database management system (DBMS) can be used to perform the validation, such as SQL schema validation for relational databases or JSON Schema validation for NoSQL databases.

Another approach is ontology reasoning, where the data model is represented as an ontology using a formal language like Web Ontology Language (OWL) or Resource Description Framework (RDF). The abstracted query representation is converted into a compatible format, such as SPARQL or OWL-DL queries, and an ontology reasoner, such as Pellet, HermiT, or FaCT++, is utilized to validate the consistency and accuracy of the query against the ontology. The reasoner can check for logical inconsistencies, class and property hierarchies, and domain and range restrictions. Alternatively, rule-based reasoning systems, such as Prolog or Datalog, can be used to define and validate the query logic against the data model rules.

Graph traversal is another approach that can be used for validation. The data model is represented as a graph, with entities as nodes and relationships as edges. The abstracted query representation is converted into a graph traversal pattern or query language, such as Gremlin or Cypher. The graph is traversed starting from the referenced entities and following the specified relationships and conditions. The traversal path is validated against the graph structure and constraints to ensure consistency and accuracy. Graph validation frameworks or libraries, such as ShEx (Shape Expressions) or SHACL (Shapes Constraint Language), can be used to define and validate the graph structure and constraints.

Constraint programming is another technique that can be employed for validation. The data model constraints and rules are expressed using a constraint programming language, such as MiniZinc or OR-Tools. The abstracted query representation is converted into a set of constraints and variables, and a constraint solver is used to find a solution that satisfies all the constraints, ensuring the query is consistent with the data model. If no solution is found, it indicates a discrepancy between the query and the data model. SMT (Satisfiability Modulo Theories) solvers, such as Z3 or CVC4, can also be used to encode the data model constraints and query logic and check for satisfiability.

Data profiling is another approach that involves analyzing the actual data stored in the database to gather statistics and patterns. The abstracted query representation is compared against the data profiles to identify potential inconsistencies or anomalies, such as data type mismatches, value range violations, or statistical outliers. Data profiling tools or techniques, such as column profiling, functional dependency analysis, or pattern matching, can be used to validate the query against the actual data. Machine learning techniques, such as anomaly detection or clustering, can also be employed to identify unusual query patterns or data discrepancies.

Interactive validation is another approach that engages the user in the validation process to clarify ambiguities or resolve discrepancies. The user is presented with the abstracted query representation, and potential inconsistencies or conflicts with the data model are highlighted. Suggestions or recommendations for correcting the query based on predefined rules or heuristics are provided, and the user is allowed to modify the query or provide additional information to resolve the issues. Natural language dialogue systems or chatbots can be used to guide the user through the validation process and gather necessary clarifications.

The choice of technique for validating the abstracted query representation against the data model depends on factors such as the complexity of the data model, the expressiveness of the query language, the available tools and libraries, and the desired level of automation and user interaction.

Thereafter, the abstracted query representation generated in this process is then used in subsequent steps to translate into a standardized expression language and ultimately to generate an executable query optimized for querying the plurality of data stores.

Figure 6:
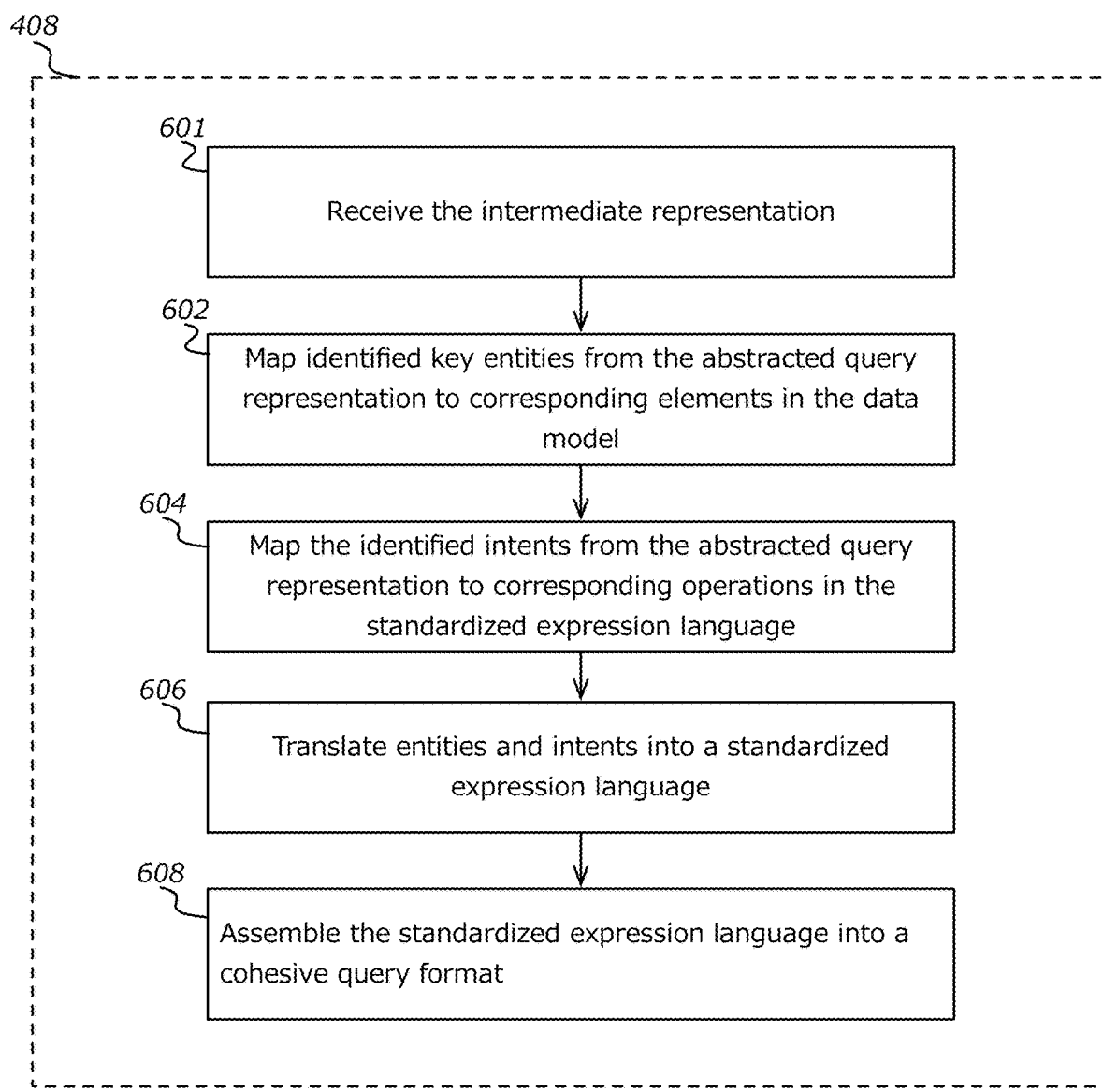
FIG. 6 illustrates an exemplary process for translating an abstracted query representation into a standardized expression language according to one embodiment of the invention.

FIG. 6 illustrates an exemplary process for translating an abstracted query representation into a standardized expression language according to one embodiment of the invention. This process is a detailed description of step 408 of FIG. 4. In embodiments, the method steps or techniques depicted and described herein can be performed using specialized algorithms for query language translation and mapping techniques. The query wise stateless structure engine 110 in FIG. 1A executes these steps, utilizing processor-executable instructions stored in a non-transitory memory. The translation techniques may involve the use of ontology-based mapping, schema alignment algorithms, and syntactic parsing frameworks such as Apache Jena, RDF, or OWL. The process may comprise additional steps, fewer steps, and/or a different order of steps without departing from the scope of the invention as would be apparent to one of ordinary skill in the art.

At step 601, the abstracted query representation generated in the previous step is received. This abstracted query representation captures the user's intent and the logical structure of the query in a structured format.

At step 602, the system maps the identified key entities from the abstracted query representation to corresponding elements in the data model. In an embodiment, this can include utilizing ontology-based mapping and schema alignment techniques to ensure that the abstracted entities are correctly linked to the specific data structures in the data model. For example, if the abstracted query representation includes "sales" and "last quarter," these elements are mapped to the corresponding "sales" entity and "time period" attribute in the data model.

At step 604, the system maps the identified intents from the abstracted query representation to corresponding operations in the standardized expression language. This standardized expression language is designed to be compatible with multiple types of database management systems, ensuring broad applicability. Techniques such as syntactic parsing and semantic analysis are employed to generate accurate and efficient expressions. In an embodiment, this can include determining the type of database operations required, such as data retrieval, aggregation, or filtering, and translating these operations into the syntax of the standardized expression language. For instance, an intent to retrieve and aggregate sales data is mapped to specific SQL commands or NoSQL operations that perform these functions.

At step 606, the mapped entities and intents are translated into a standardized expression language using techniques such as syntactic parsing and semantic analysis. This standardized expression language is designed to be compatible with multiple types of database management systems, ensuring broad applicability. Additionally, the system integrates conditional expressions from the natural language query, such as filters, sorting, and aggregation operations, into the appropriate syntax of the standardized expression language. For example, a condition like 'last quarter' is converted into a SQL WHERE clause or a NoSQL filter that accurately reflects the time period specified by the user.

At step 608, the system assembles the standardized expression language into a cohesive query format. In an embodiment, this can involve combining the mapped entities, intents, and conditional expressions into a structured query that is compatible with multiple types of database management systems. The assembled query is designed to accurately represent the user's request while ensuring compatibility with the underlying data structures and schemas of the data stores. In an embodiment, techniques such as syntactic parsing and semantic analysis are employed to generate accurate and efficient expressions. For instance, the final standardized expression language might be a well-formed SQL query or an API call that retrieves and processes the required data.

In certain embodiments, the standardized expression can be validated to ensure it aligns with the constraints and rules defined by the data model. This validation process involves checking for consistency, syntax correctness, and adherence to database-specific requirements. If any issues are found, adjustments are made to the expression to ensure it is fully optimized for the intended database systems.

Figure 7:
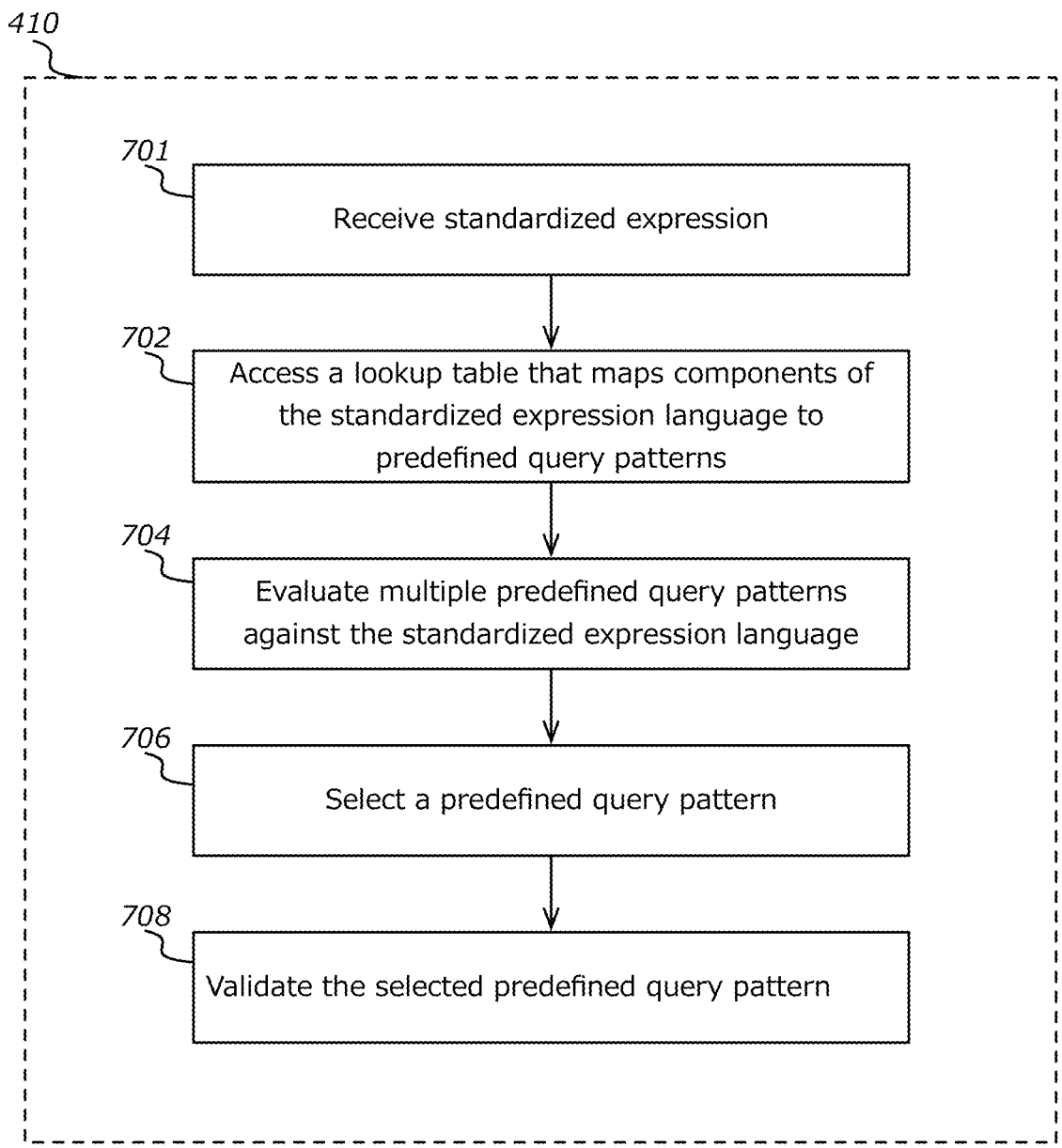
FIG. 7 illustrates an exemplary process for identifying a predefined query pattern according to one embodiment of the invention.

FIG. 7 illustrates an exemplary process for executing a set of lookup functions to identify a predefined query pattern according to one embodiment of the invention. This process is a detailed description of step 410 of FIG. 4. In embodiments, the method steps or techniques depicted and described herein can be performed using advanced lookup algorithms and optimization techniques. The query wise stateless structure engine 110 in FIG. 1A executes these steps, utilizing processor-executable instructions stored in a non-transitory memory. The lookup functions may involve accessing data dictionaries, query pattern repositories, and performance metric evaluation frameworks. The process may comprise additional steps, fewer steps, and/or a different order of steps without departing from the scope of the invention as would be apparent to one of ordinary skill in the art.

At 701, the standardized expression generated in the previous step is received. This expression serves as the basis for identifying the appropriate predefined query pattern.

At step 702, the system accesses a lookup table that maps components of the standardized expression language to predefined query patterns. This involves retrieving the lookup table stored in a database or memory, which contains mappings between the elements of the standardized expression language and corresponding query patterns. The lookup table serves as a reference to quickly identify potential query patterns based on the standardized expressions derived from the user's query.

At step 704, the system evaluates multiple predefined query patterns against the standardized expression language based on at least one system performance metric. This involves comparing different query patterns to determine which ones align best with the standardized expression language and assessing their performance metrics such as query execution time, memory usage, CPU load, and data throughput. The evaluation process may involve simulating the execution of each query pattern to estimate its performance characteristics.

At step 706, the system selects the predefined query pattern that optimizes the at least one system performance metric for querying the plurality of data stores. This selection process involves choosing the query pattern that provides the best performance according to the evaluated metrics. For instance, if query execution time is a critical performance metric, the system will select the query pattern that is expected to execute the fastest while still accurately fulfilling the user's request.

At step 708, the system validates the selected predefined query pattern against real-time system conditions. This involves checking the selected query pattern to ensure it remains optimal under current system conditions such as network latency, database load, and data cache utilization. If necessary, the system may adjust the query pattern or select an alternative pattern that better fits the real-time conditions to maintain optimal performance.

Figure 8:
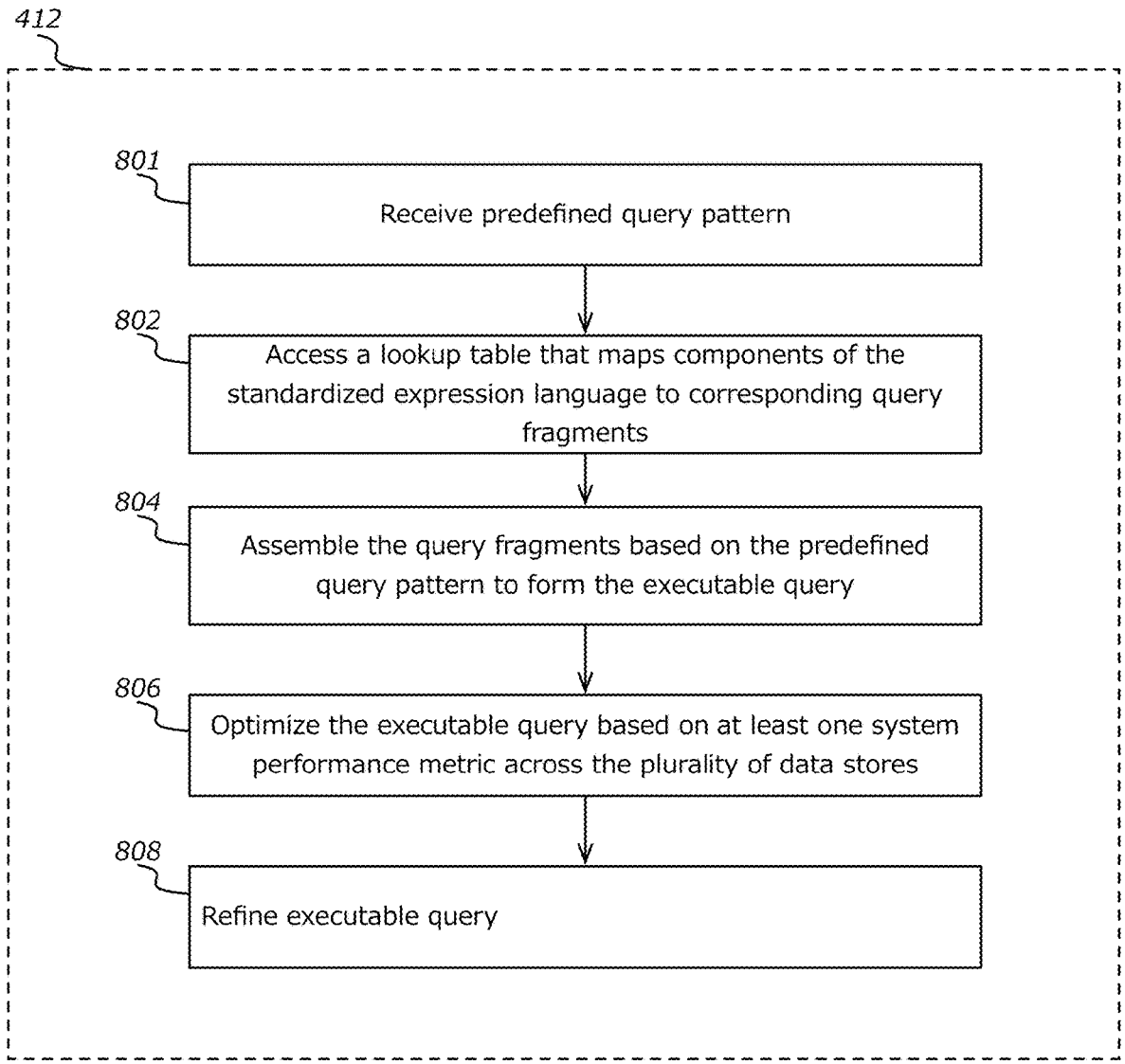
FIG. 8 illustrates an exemplary process for generating and optimizing an executable query according to one embodiment of the invention.

FIG. 8 illustrates an exemplary process for generating and optimizing an executable query from an identified predefined query pattern according to one embodiment of the invention. This process is a detailed description of step 412 of FIG. 4. In embodiments, the method steps or techniques depicted and described herein can be performed using advanced query assembly and optimization algorithms. The query wise stateless structure engine 110 in FIG. 1A executes these steps, utilizing processor-executable instructions stored in a non-transitory memory. The optimization techniques may include cost-based optimization, heuristic-based tuning, and the use of machine learning models. The process may comprise additional steps, fewer steps, and/or a different order of steps without departing from the scope of the invention as would be apparent to one of ordinary skill in the art.

At step 801, the identified predefined query pattern is received. This pattern forms the blueprint for constructing the executable query. At step 802, the system accesses a lookup table that maps components of the standardized expression language to corresponding query fragments. This involves retrieving the lookup table stored in a database or memory, which contains mappings between the elements of the standardized expression language and corresponding query fragments. These query fragments are pre-defined portions of executable queries that can be assembled into a complete query. At step 804, the system assembles the query fragments based on the predefined query pattern to form the executable query. This involves combining the retrieved query fragments according to the structure and logic specified by the predefined query pattern. The assembly process ensures that the executable query is syntactically correct and logically coherent, capable of retrieving the desired data from the plurality of data stores.

At step 806, the system optimizes the executable query based on at least one system performance metric across the plurality of data stores. In an embodiment, the optimization process may involve applying cost-based optimization techniques, heuristic-based tuning, and leveraging machine learning models to ensure the query is executed in the most efficient manner possible, reducing execution time and resource usage while maximizing data throughput. In an embodiment, optimization may include analyzing the executable query to identify potential inefficiencies and applying optimization techniques to enhance its performance. Optimization techniques may include reordering join operations, indexing frequently accessed columns, and minimizing data transfer between distributed data stores. The goal is to reduce query execution time, memory usage, CPU load, and other relevant performance metrics.

At step 808, the system may refine the executable query. In an embodiment, the system may utilize a large language model (LLM) trained on a corpus of query patterns and system performance metrics to further refine the executable query. This involves feeding the initial executable query into the LLM, which analyzes the query and suggests improvements based on its training data. The LLM may propose optimized query structures, alternative execution plans, or other enhancements that align with the system performance metrics.

Thereafter, the executable query is then validated and, if necessary, further adjusted to ensure optimal performance.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above-mentioned systems, units, modules, engines, controllers, interfaces, components, or the like may comprise hardware and/or software as described herein. For example, the enterprise system 101, the query wise stateless structure engine 110, the query generation system 120, the network 104, and subcomponents thereof may comprise computing hardware and/or software as described herein in association with FIGS. 1-8. Furthermore, any of the above-mentioned systems, units, modules, engines, controllers, interfaces, components, or the like may use and/or comprise an application programming interface (API) for communicating with other systems, units, modules, engines, controllers, interfaces, components, or the like for obtaining and/or providing data or information.

Figure 9:
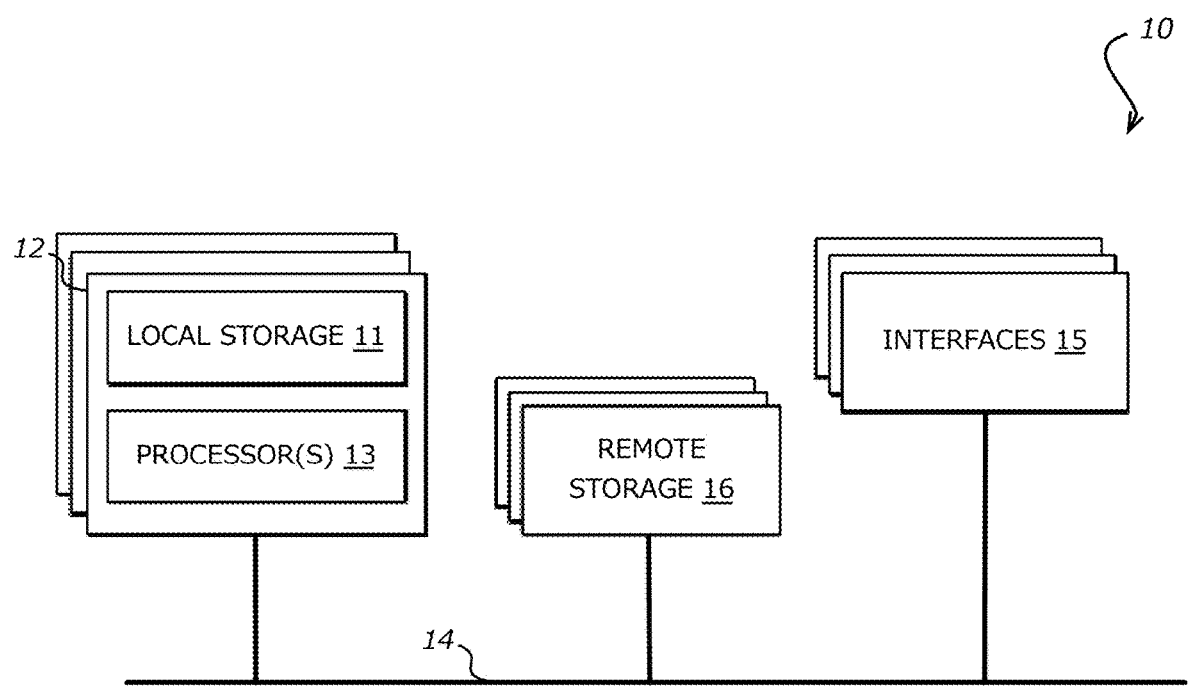
FIG. 9 illustrates one embodiment of the computing architecture that supports an embodiment of the inventive disclosure.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
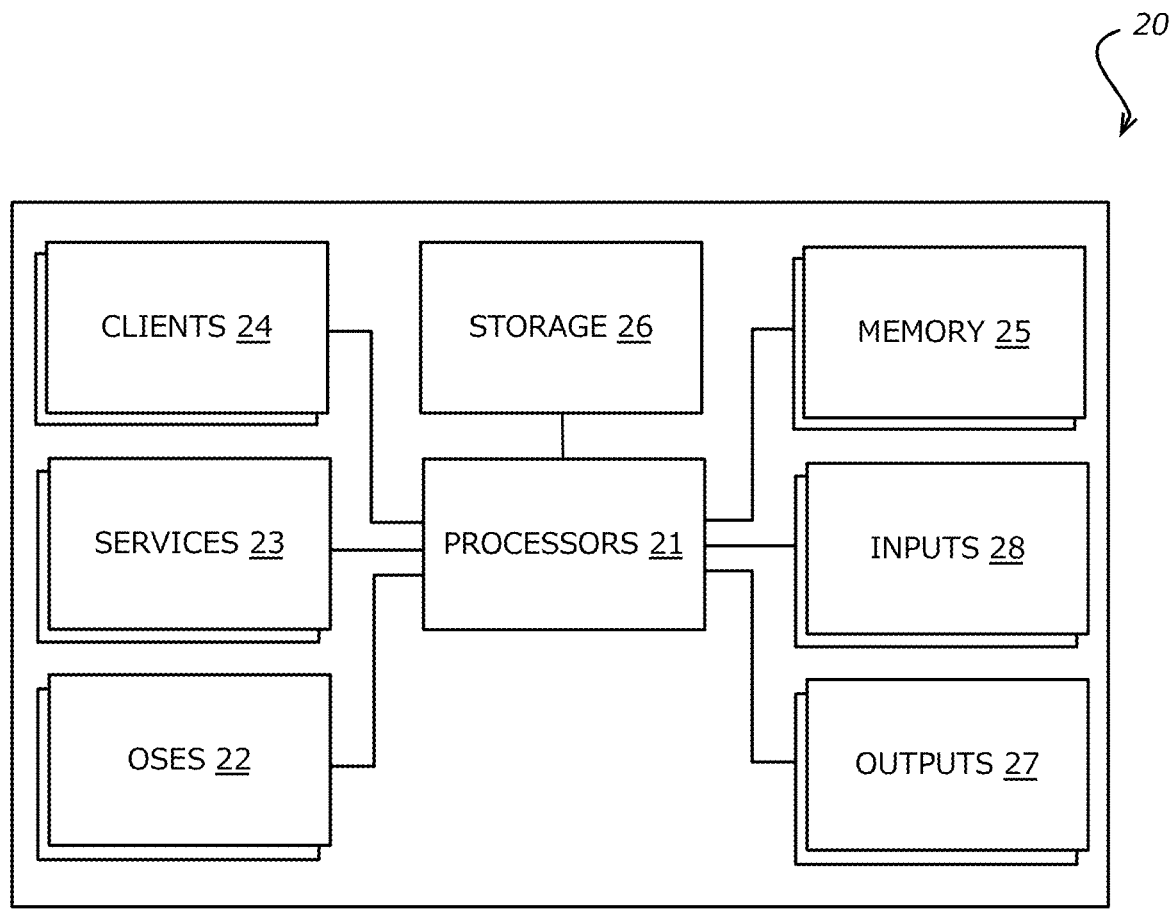
FIG. 10 illustrates components of a system architecture that supports an embodiment of the inventive disclosure.

In some embodiments, systems may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
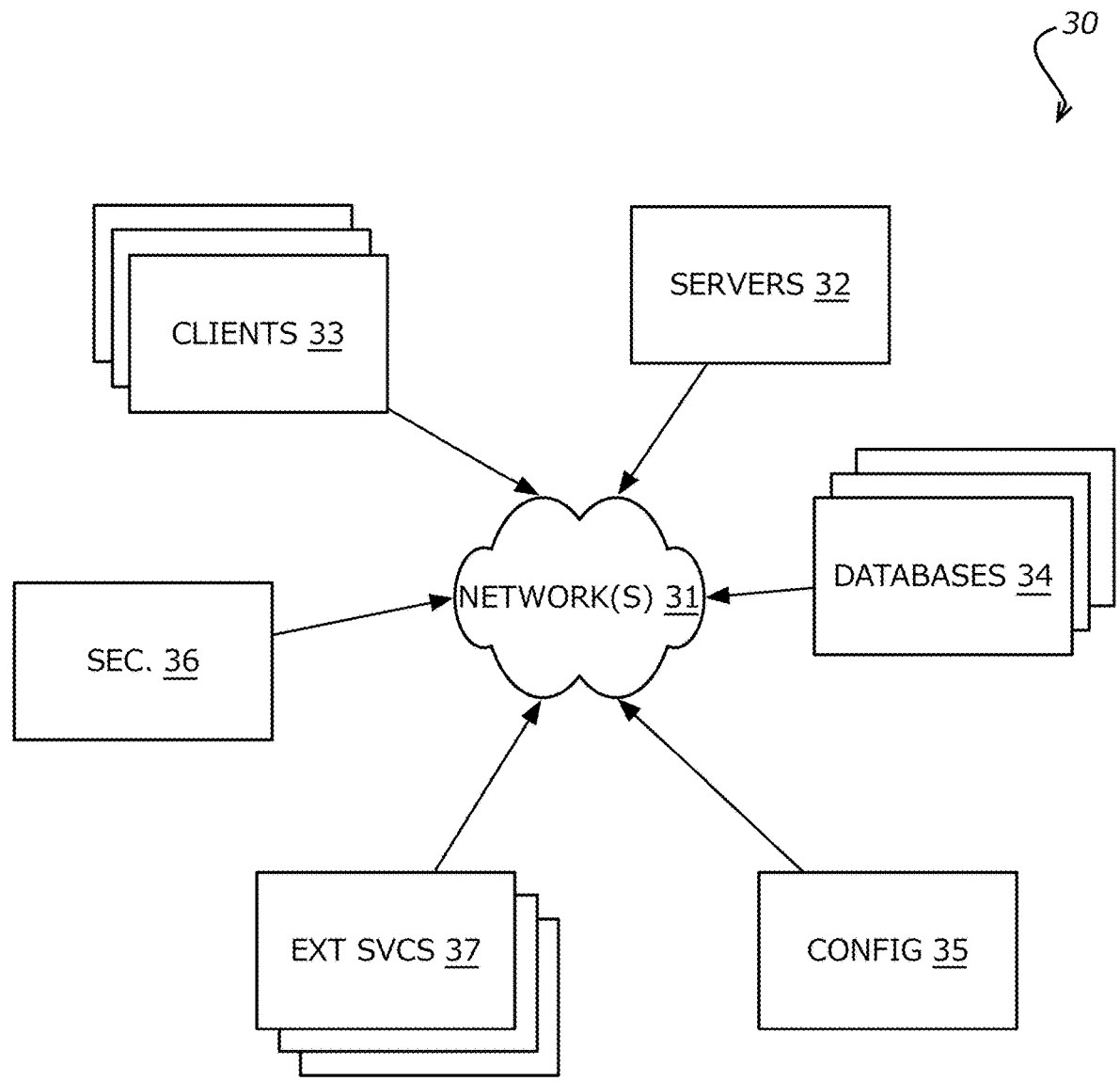
FIG. 11 illustrates components of a computing device that supports an embodiment of the inventive disclosure.

In some embodiments, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 12:
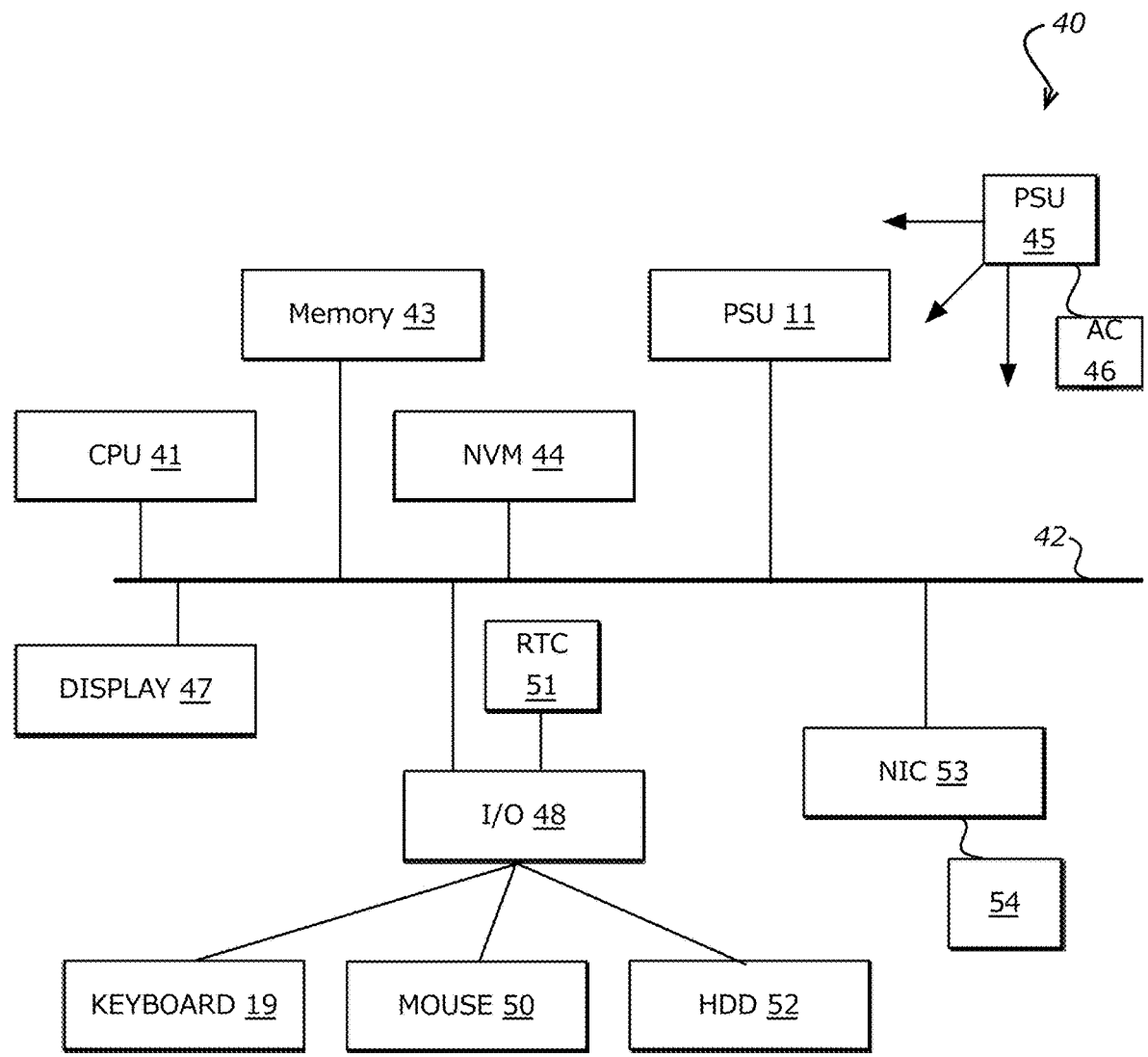
FIG. 12 illustrates components of a computing device that supports an embodiment of the inventive disclosure.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for data retrieval and providing structured access to data distributed across multiple disparate data stores, the computer-implemented method comprising:
receiving a data model associated with a plurality of data stores connected via a network;
obtaining a natural language question from a user for a data set comprising data associated with data elements, the data set being maintained across the plurality of data stores and stored in a non-standardized format, wherein the data elements lack predefined relationships or schema-level linkages, the plurality of data stores being accessible by the user via a client-side interface but not directly accessible by a computing device processing the natural language question, wherein one or more of metadata and/or query-specific parameters are transmitted to the computer device for query processing;
generating an abstracted query representation from the obtained natural language question, wherein the abstracted query representation comprises an intermediate representation of the natural language question that comprises relevant entities and intents of the natural language question without specific database syntax;
translating the abstracted query representation into a standardized expression language based at least in part on the data model describing entities, attributes, and relationships within the plurality of data stores, wherein translating utilizes a large language model (LLM) for linguistic and syntactic processing, and wherein the standardized expression language comprises a format compatible with multiple types of database management systems and includes specific syntax for at least one of data types, operations, or conditions;
executing a set of lookup functions to identify a predefined query pattern for querying the plurality of data stores, wherein the predefined query pattern corresponds to the standardized expression language, the predefined query pattern being selected based on at least one system performance metric;
generating an executable query from the identified predefined query pattern, the executable query being optimized for the at least one system performance metric across the plurality of data stores; and
providing the executable query to a client-side agent with access to the plurality of data stores, the client-side agent executing the executable query to retrieve the data set, wherein the data set is formatted as a structured view enabling unified access to data dispersed across the plurality of data stores.

2. The computer-implemented method of claim 1, wherein the data model comprises entities, attributes, and relationships describing a data structure of the plurality of data stores and metadata indicating the data types, constraints, and relationships between data entities stored across the plurality of data stores.

3. The computer-implemented method of claim 1, wherein generating the abstracted query representation further comprises:
parsing the natural language question to identify the relevant entities and the intents; and
generating the intermediate representation based at least in part on the identified relevant entities and the intents.

4. The computer-implemented method of claim 1, wherein translating the abstracted query representation into the standardized expression language comprises:
mapping identified relevant entities and the intents to corresponding elements in the data model.

5. The computer-implemented method of claim 1, further comprising:
parsing the data model to identify entity relationships and attributes;
mapping the identified entity relationships and attributes to corresponding elements within the standardized expression;
updating the predefined query patterns based on changes detected in the data model to maintain alignment with a database schema; and
utilizing the updated predefined query patterns in the generation of executable queries.

6. The computer-implemented method of claim 1, wherein the standardized expression language is selected from one of a Structured Query Language (SQL), NoSQL, and an application programming interface (API) specification.

7. The computer-implemented method of claim 1, wherein the at least one system performance metric comprises at least one of query execution time, memory usage, CPU load, utilization rates of data caches, data throughput, or network latency.

8. The computer-implemented method of claim 1, wherein executing the set of lookup functions comprises:
accessing a lookup table that maps standardized expression language components to predefined query patterns;
evaluating multiple predefined query patterns against the standardized expression language based on the at least one system performance metric; and
selecting the predefined query pattern that optimizes the at least one system performance metric for querying the plurality of data stores.

9. The computer-implemented method of claim 1, wherein the standardized expression language comprises:
a structured query format derived from the natural language question, the structured query format being compatible with multiple types of database management systems;
identifiers indicating at least one of specific data types, data sources, or operations requested in the natural language question; and
conditional expressions that specify data filtering, sorting, and aggregation operations to be applied in the natural language question.

10. The computer-implemented method of claim 1, wherein the predefined query pattern comprises at least one of:
a template for constructing queries, including predefined query structures tailored for specific types of data retrieval tasks;
optimization parameters based on historical data retrieval patterns and system metrics;
mappings of standardized expression language components to corresponding database commands for execution across the plurality of data stores; or
rules for adjusting a query structure based on real-time system performance data.

11. The computer-implemented method of claim 1, wherein generating the executable query from the identified predefined query pattern comprises:

accessing a lookup table that maps components of the standardized expression to corresponding query fragments;

assembling the corresponding query fragments based on the predefined query pattern to form the executable query; and optimizing the executable query based on the at least one system performance metric across the plurality of data stores.

12. The computer-implemented method of claim 1, wherein generating the executable query from the identified predefined query pattern comprises:

utilizing a large language model (LLM) trained on a corpus of query patterns and system performance metrics to translate the predefined query pattern into the executable query; and analyzing the predefined query pattern with the LLM to generate optimized query commands.

13. A system for data retrieval and providing structured access to data distributed across multiple disparate data stores, the system comprising:

a network interface for connecting to a plurality of data stores;

a processor; and a non-transitory computer-readable storage medium storing instructions that, when executed by the processor, cause the system to:

receive a data model associated with the plurality of data stores;

obtain a natural language question from a user for a data set comprising data associated with data elements, the data set being maintained across the plurality of data stores and stored in a non-standardized format, wherein the data elements lack predefined relationships or schema-level linkages, the plurality of data stores being accessible by the user via a client-side interface but not directly accessible by a computing device processing the natural language question, wherein one or more of metadata and/or query-specific parameters are transmitted to the computer device for query processing;

generate an abstracted query representation from the obtained natural language question, wherein the abstracted query representation comprises an intermediate representation of the natural language question that comprises relevant entities and intents of the natural language question without specific database syntax;

translate the abstracted query representation into a standardized expression language based at least in part on the data model describing entities, attributes, and relationships within the plurality of data stores, wherein translating utilizes a large language model (LLM) for linguistic and syntactic processing, and wherein the standardized expression language comprises a format compatible with multiple types of database management systems and includes specific syntax for at least one of data types, operations, or conditions;

execute a set of lookup functions to identify a predefined query pattern for querying the plurality of data stores, wherein the predefined query pattern corresponds to the standardized expression language and is selected based on at least one system performance metric;

generate an executable query from the identified predefined query pattern, the executable query being optimized for the at least one system performance metric across the plurality of data stores; and provide the executable query to a client-side agent with access to the plurality of data stores, the client-side agent executing the executable query to retrieve the data set, wherein the data set is formatted as a structured view enabling unified access to data dispersed across the plurality of data stores.

14. The system of claim 13, wherein the instructions for generating the abstracted query representation further cause the system to:

parse the natural language question to identify the relevant entities and the intents; and generate an intermediate representation based at least in part on identified relevant entities and the intents.

15. The system of claim 13, wherein the instructions for translating the abstracted query representation into the standardized expression language further cause the system to:

map the identified relevant entities and the intents to corresponding elements in the data model.

16. The system of claim 13, wherein the instructions for executing the set of lookup functions further cause the system to:

access a lookup table that maps standardized expression language components to predefined query patterns;

evaluate multiple predefined query patterns against the standardized expression language based on the at least one system performance metric; and select the predefined query pattern that optimizes the at least one system performance metric for querying the plurality of data stores.

17. A non-transitory computer readable storage medium storing instructions that, when executed by at least one processor of a computing system, causes the computing system to:

receive a data model associated with a plurality of data stores;

obtain a natural language question from a user for a data set comprising data associated with data elements, the data set being maintained across the plurality of data stores and stored in a non-standardized format, wherein the data elements lack predefined relationships or schema-level linkages, the plurality of data stores being accessible by the user via a client-side interface but not directly accessible by a computing device processing the natural language question, wherein one or more of metadata and/or query-specific parameters are transmitted to the computer device for query processing;

generate an abstracted query representation from the obtained natural language question, wherein the abstracted query representation comprises an intermediate representation of the natural language question that comprises relevant entities and intents of the natural language question without specific database syntax;

translate the abstracted query representation into a standardized expression language based at least in part on the data model describing entities, attributes, and relationships within the plurality of data stores, wherein translating utilizes a large language model (LLM) for linguistic and syntactic processing, and wherein the standardized expression language comprises a format compatible with multiple types of database management systems and includes specific syntax for at least one of data types, operations, or conditions;

execute a set of lookup functions to identify a predefined query pattern for querying the plurality of data stores, wherein the predefined query pattern corresponds to the standardized expression language and is selected based on at least one system performance metric;

generate an executable query from the identified predefined query pattern, the executable query being optimized for the at least one system performance metric across the plurality of data stores; and provide the executable query to a client-side agent with access to the plurality of data stores, the client-side agent executing the executable query to retrieve the data set, wherein the data set is formatted as a structured view enabling unified access to data dispersed across the plurality of data stores.

18. The non-transitory computer readable storage medium of claim 17, wherein the instructions, when executed by the at least one processor to generate the abstracted query representation, further enables the computing system to:

parse the natural language question to identify the relevant entities and the intents; and generate an intermediate representation based at least in part on identified relevant entities and the intents.

19. The non-transitory computer readable storage medium of claim 17, wherein the instructions, when executed by the at least one processor to translate the abstracted query representation into the standardized expression language, further enables the computing system to:

map the identified relevant entities and the intents to corresponding elements in the data model.

20. The non-transitory computer readable storage medium of claim 17, wherein the instructions, when executed by the at least one processor to execute the set of lookup functions further enables the computing system to:

access a lookup table that maps standardized expression language components to predefined query patterns;

evaluate multiple predefined query patterns against the standardized expression language based on the at least one system performance metric; and select the predefined query pattern that optimizes the at least one system performance metric for querying the plurality of data stores.

* * * * *